United States Patent [19]

Brown et al.

[11] Patent Number: 4,780,657
[45] Date of Patent: Oct. 25, 1988

[54] VECTOR CONTROL SYSTEMS FOR MULTIPHASE A.C. MACHINES

[75] Inventors: Joseph E. Brown; Peter Vas, both of Newcastle upon Tyne, England

[73] Assignee: National Research Development Corporation, London, England

[21] Appl. No.: 14,518

[22] Filed: Feb. 13, 1987

[30] Foreign Application Priority Data

Feb. 15, 1986 [GB] United Kingdom ............... 8603800

[51] Int. Cl.⁴ .................................. H02P 5/40
[52] U.S. Cl. .................. 318/805; 318/808; 318/800
[58] Field of Search .......... 318/800, 802, 803, 805, 318/807–811; 324/158 MG

[56] References Cited

U.S. PATENT DOCUMENTS

| | | | |
|---|---|---|---|
| 4,431,957 | 2/1984 | Chausse et al. | 318/805 |
| 4,441,065 | 4/1984 | Bayer et al. | 318/808 |
| 4,470,000 | 9/1984 | Heinle | 318/805 |
| 4,484,128 | 11/1984 | Jotten et al. | 318/805 |
| 4,511,978 | 4/1985 | Reng | 318/808 |
| 4,593,240 | 6/1986 | Blasche | 318/800 |

*Primary Examiner*—David Smith, Jr.
*Attorney, Agent, or Firm*—Cushman, Darby & Cushman

[57] ABSTRACT

A control system for an M-phase a.c. machine which measures the currents in at least $(M-N)$ phases, where $N=2$ if M is even and $N=1$ if M is uneven, measures the instantaneous values of the voltages in $(M-N)$ phases and obtains control signals for alteration of the input voltage and/or current to the motor to maintain the motor in an efficient running condition.

3 Claims, 31 Drawing Sheets

Monitoring $u_a$, $u_b$, $u_c$, $i_a$, $i_b$, $i_c$

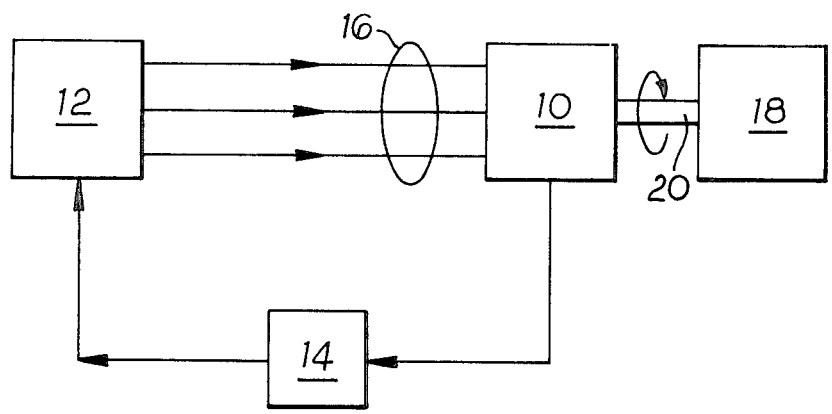
Fig.1
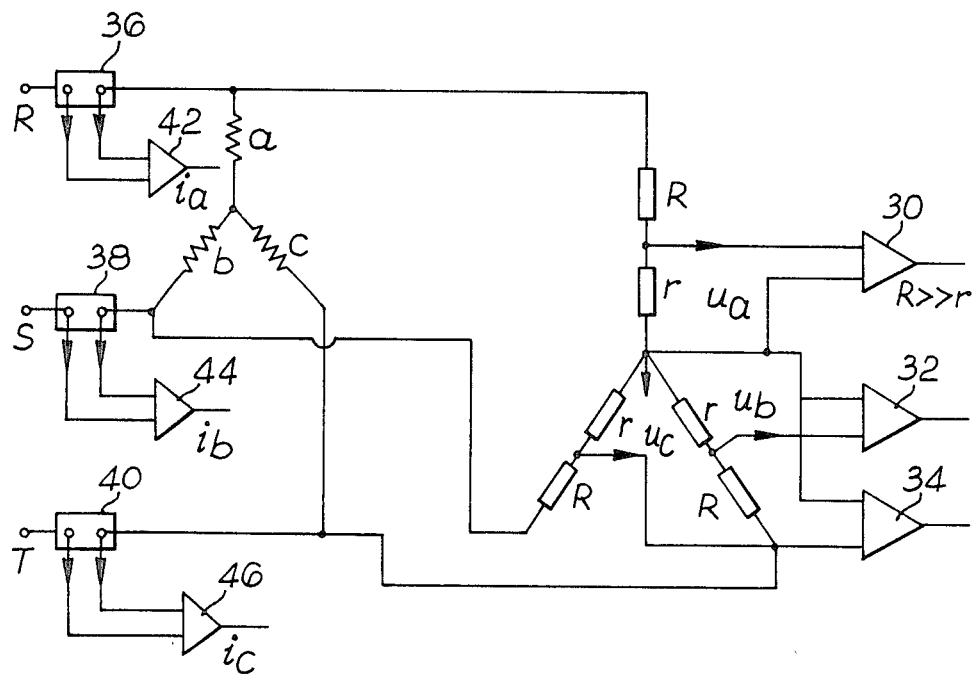
Fig.2 Monitoring $u_a, u_b, u_c, i_a, i_b, i_c$

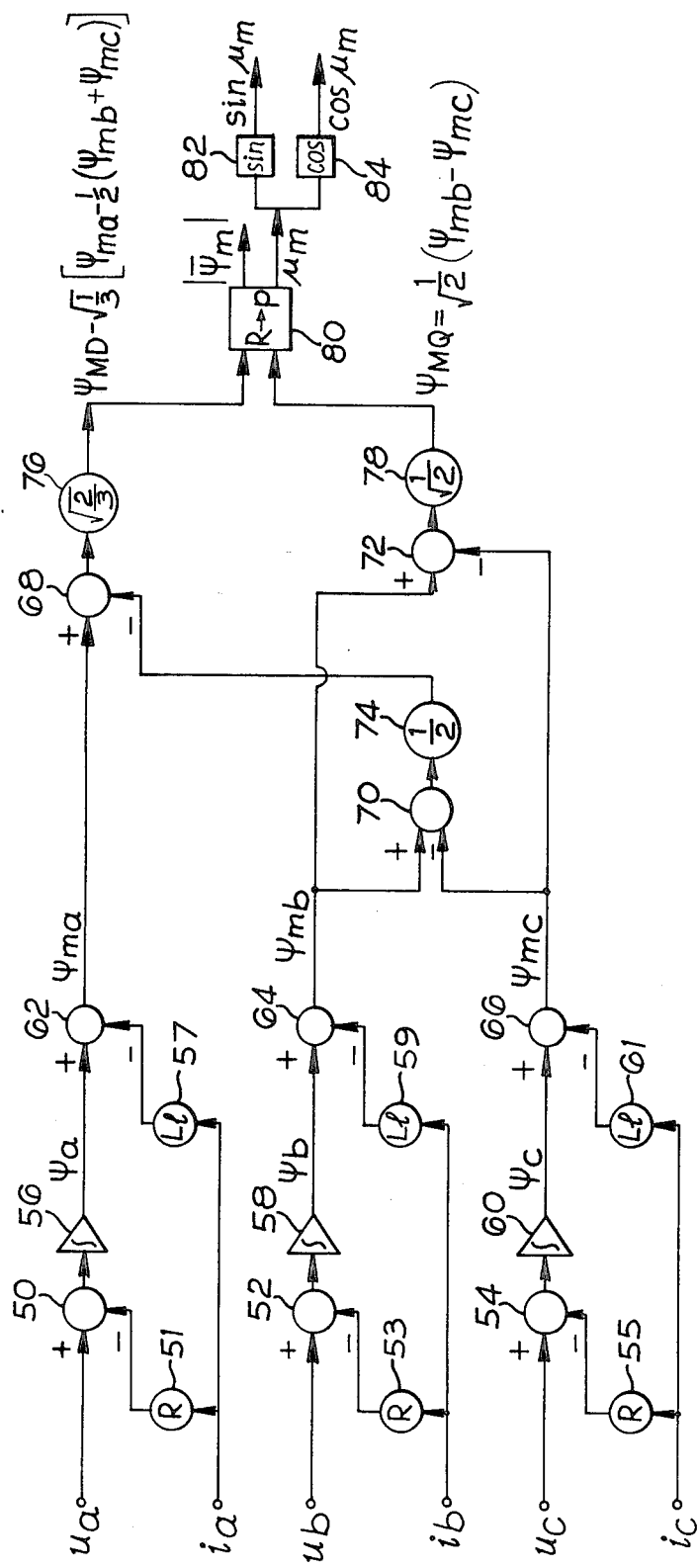
Fig. 3 Obtaining $|\bar{\psi}_m|, \mu_m, \sin\mu_m, \cos\mu_m$

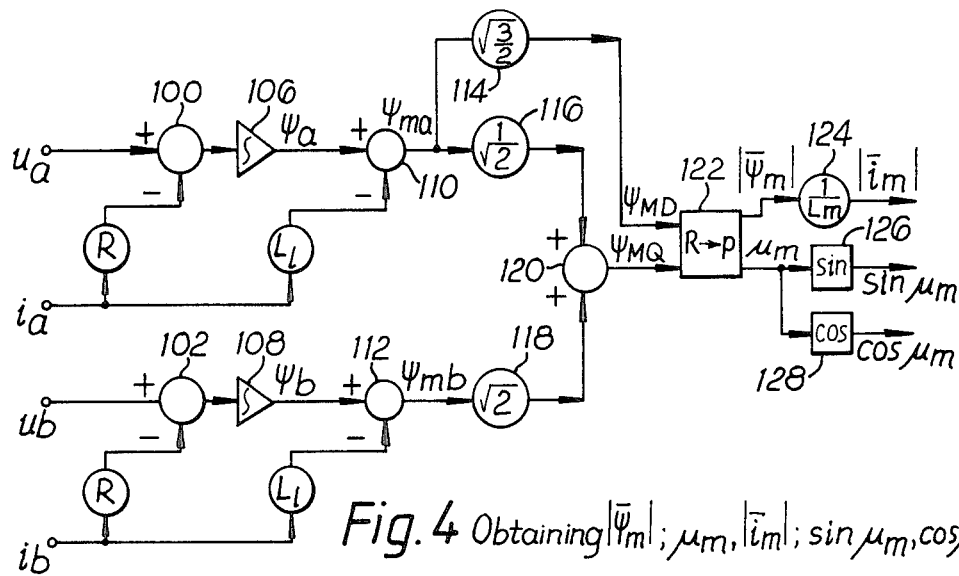
Fig. 4 Obtaining $|\bar{\psi}_m|; \mu_m, |\bar{i}_m|; \sin\mu_m, \cos\mu_m$
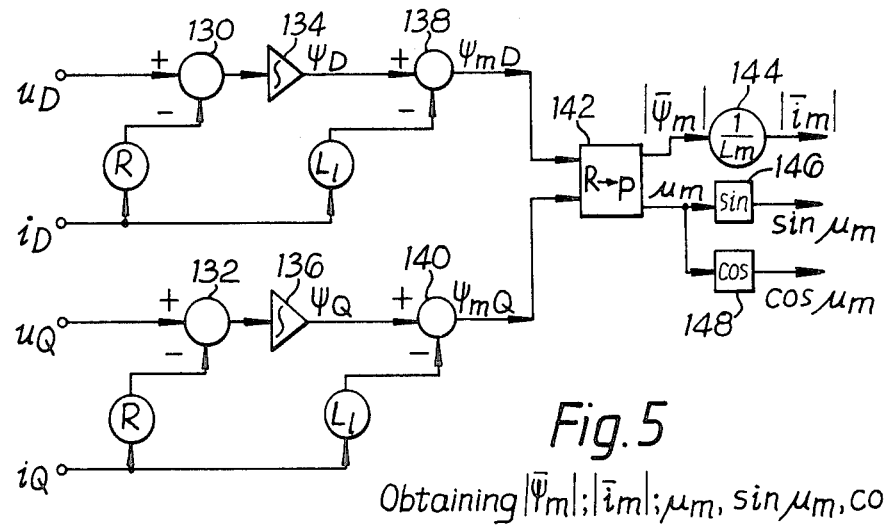
Fig. 5 Obtaining $|\bar{\psi}_m|; |\bar{i}_m|; \mu_m, \sin\mu_m, \cos\mu_m$
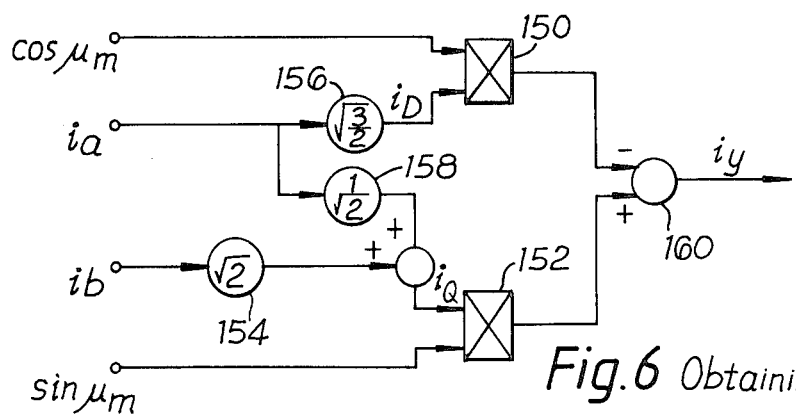
Fig. 6 Obtaining $i_y$

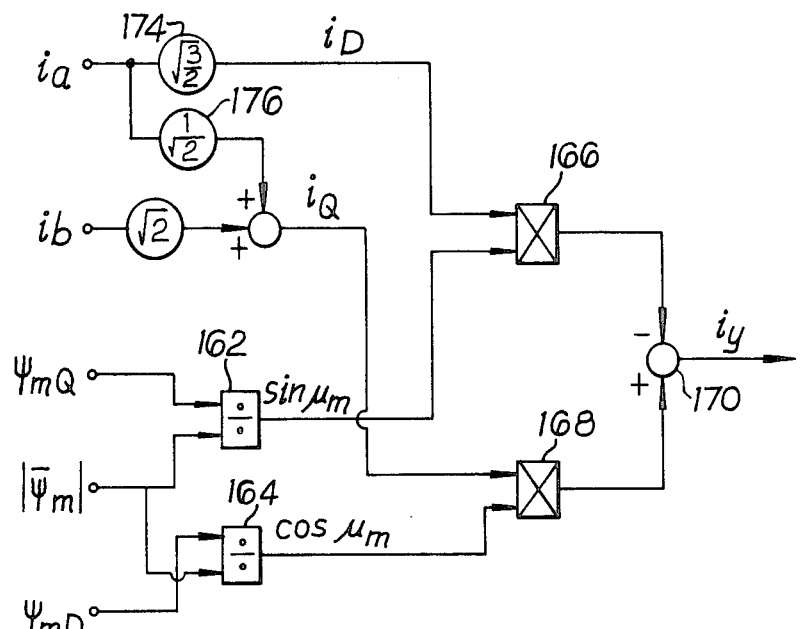
Fig. 7 Obtaining $i_y$
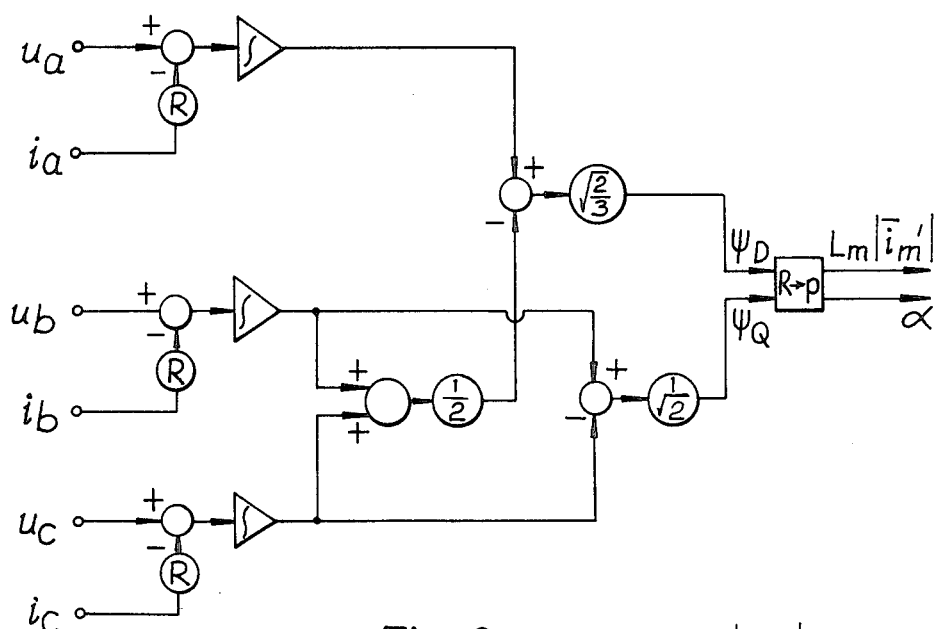
Fig. 8 Obtaining $L_m|\bar{i}_m'|, \alpha$

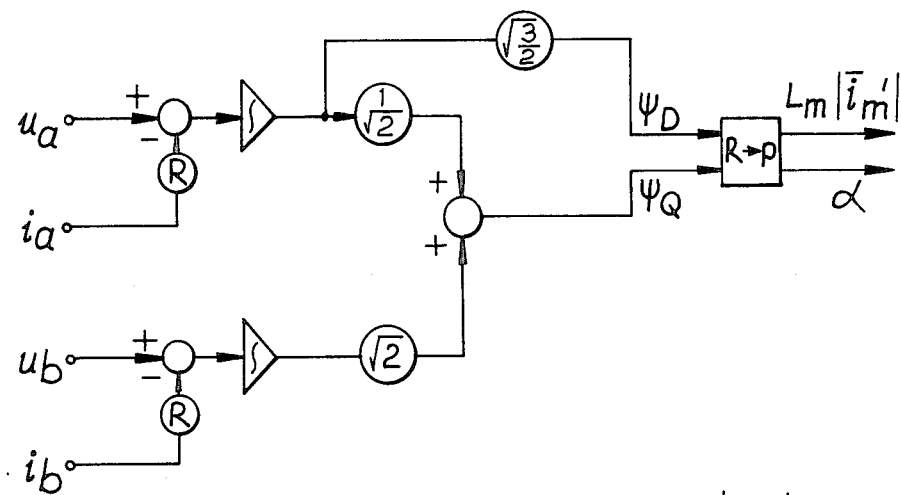
Fig. 9 Obtaining $L_m|\bar{i}'_m|, \alpha$
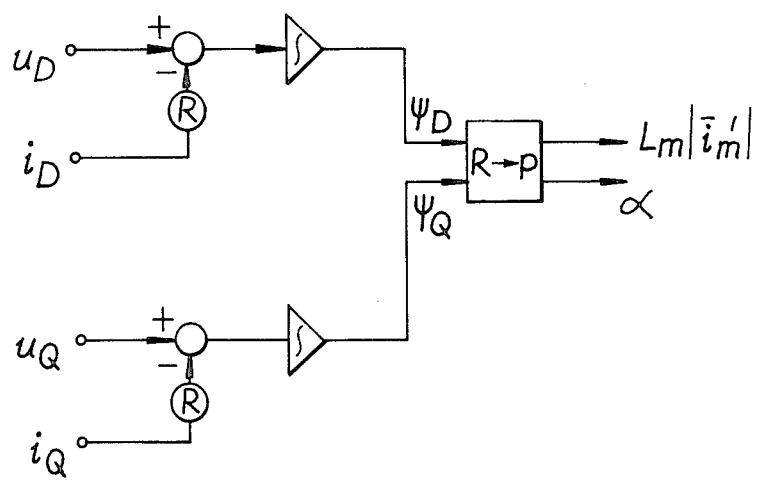
Fig. 10 Obtaining $|\bar{i}'_m|, \alpha$

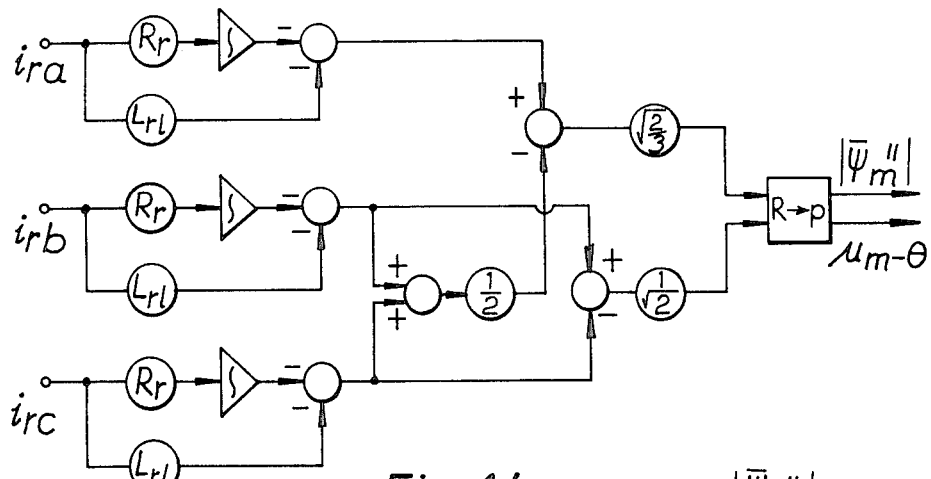
Fig. 14 Obtaining $|\bar{\psi}_m''|, \mu_m - \theta$
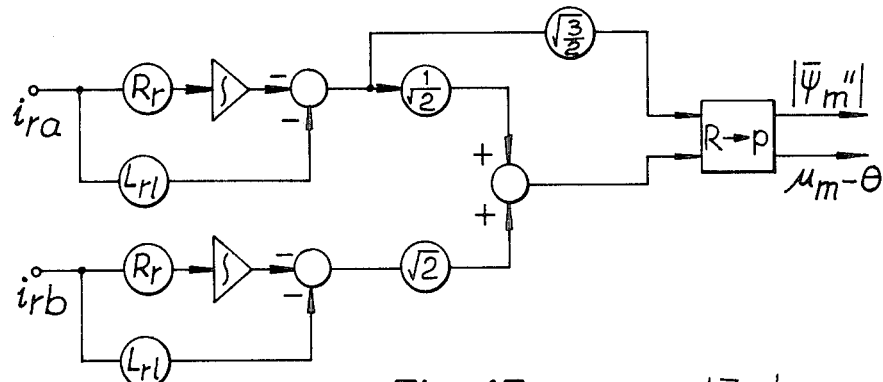
Fig. 15 Obtaining $|\bar{\psi}_m''|, \mu_m - \theta$
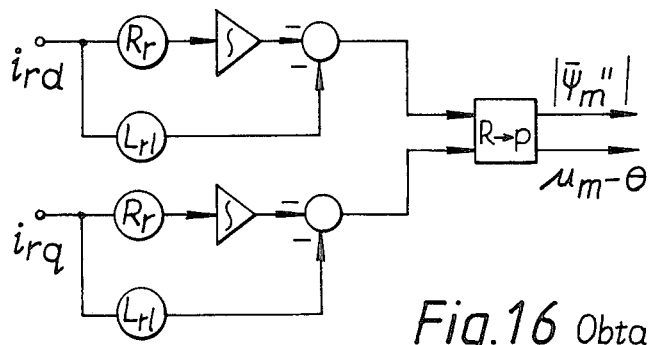
Fig. 16 Obtaining $|\bar{\psi}_m''|, \mu_m - \theta$

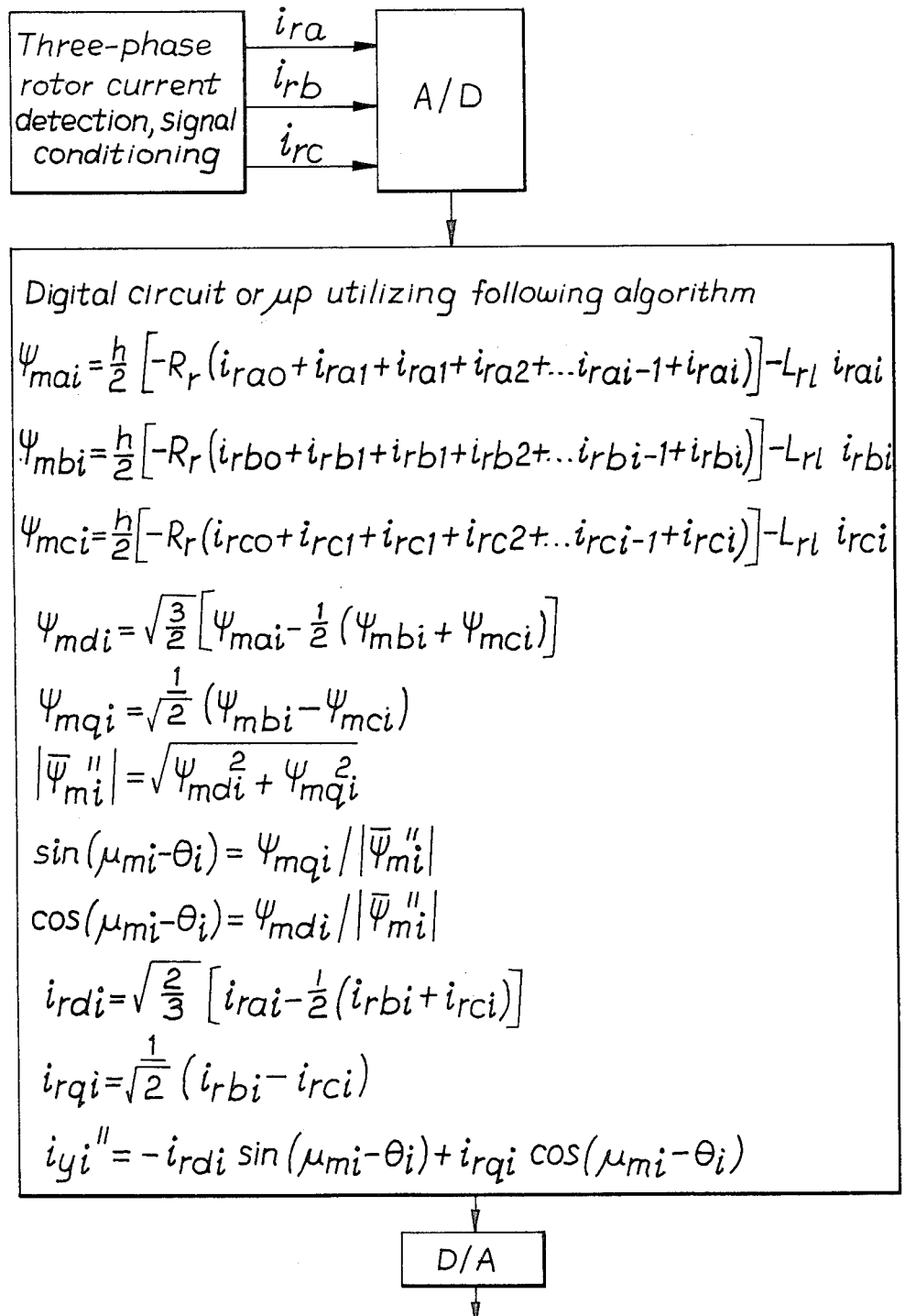
Fig. 17   $|\bar{\psi}_m''|$, $i_y''$, $\cos(\mu_m-\theta)$, $\sin(\mu_m-\theta)$

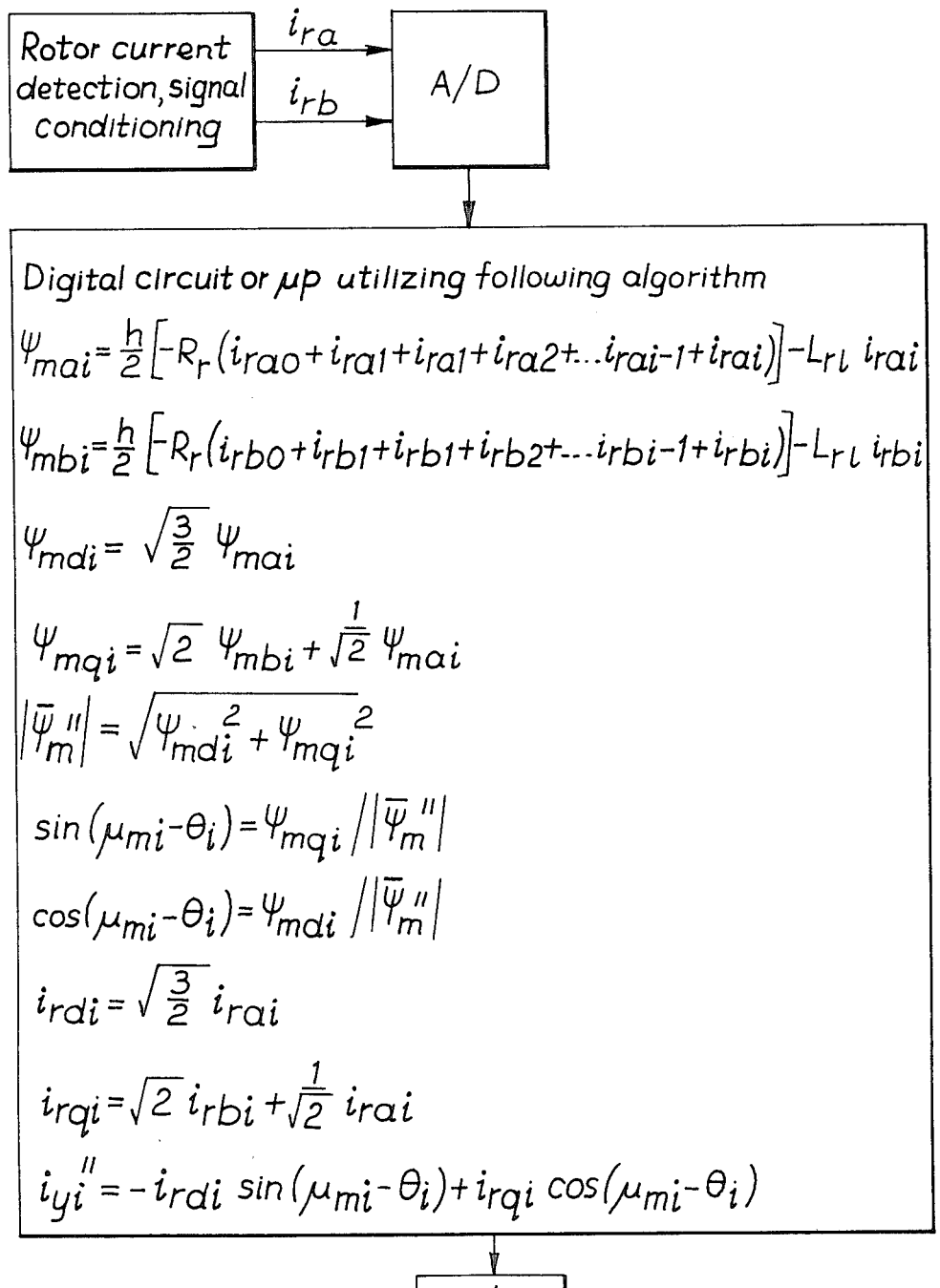
Fig. 18    $|\bar{\psi}_m''|$, $i_y''$, $\cos(\mu_{mi}-\theta_i)$ $\sin(\mu_{mi}-\theta_i)$

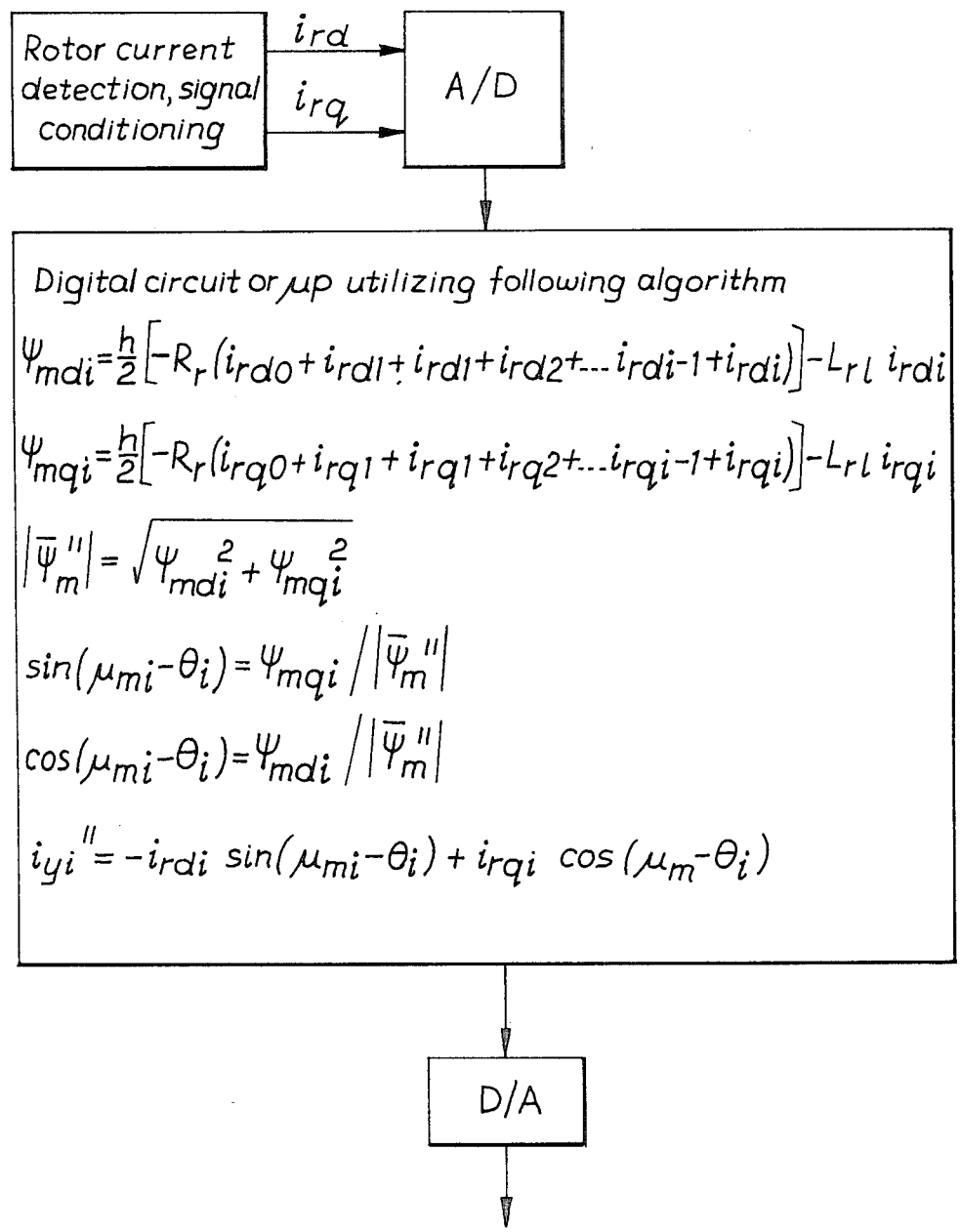
Fig. 19   $|\bar{\psi}_m''|$, $i_y''$, $\cos(\mu_m - \theta)$, $\sin(\mu_m - \theta)$

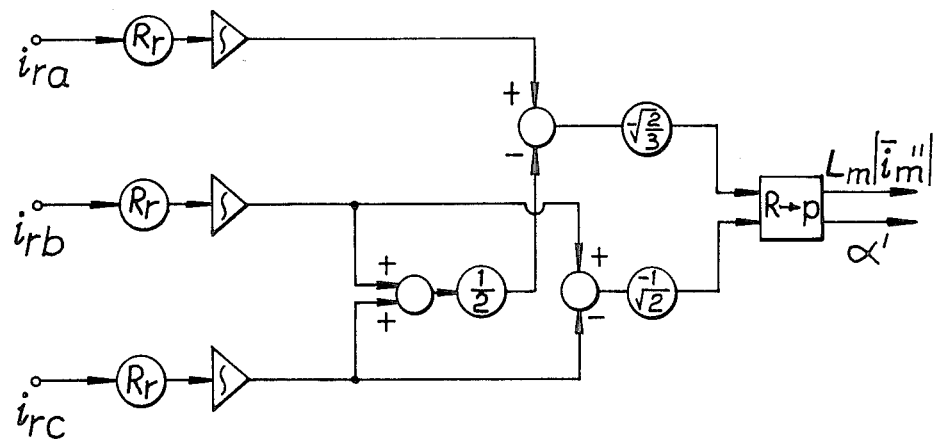
Fig. 20 Obtaining $L_m|\bar{i}_m''|, \alpha'$
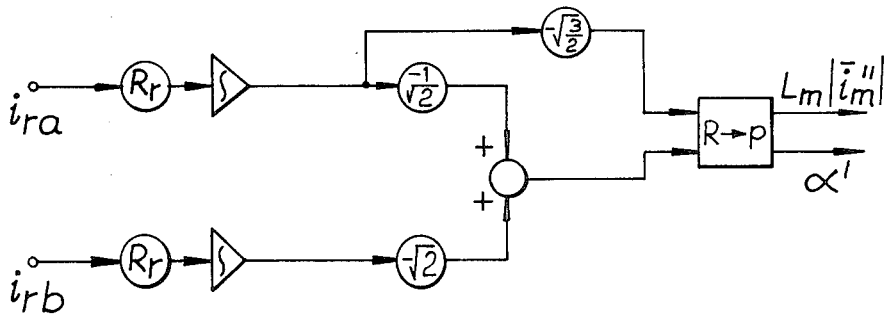
Fig. 21 Obtaining $L_m|\bar{i}_m''|, \alpha'$
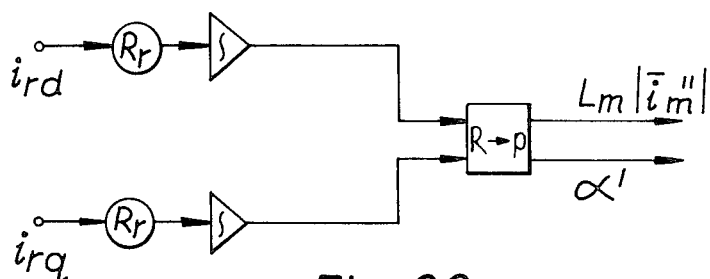
Fig. 22 Obtaining $L_m|\bar{i}_m''|, \alpha'$ Fig. 24  $L_m|\bar{i}_m''|$, $i_y'''$, $\cos\alpha'$, $\sin\alpha'$

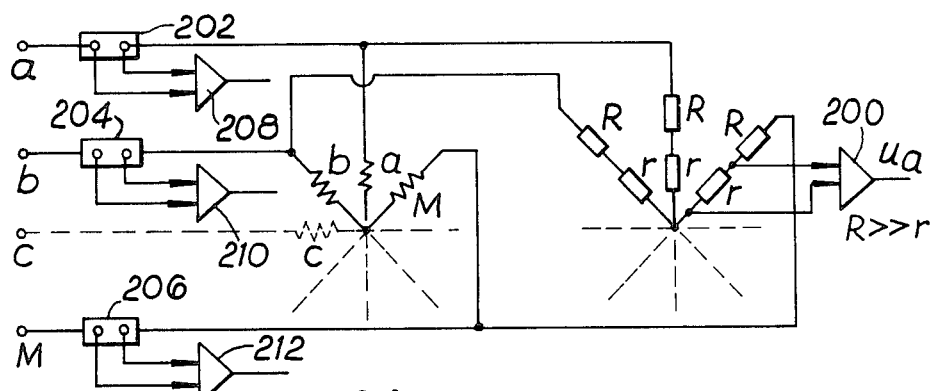
Fig. 26 Monitoring $u_a, u_b, \ldots u_M$; $i_a, i_b \ldots i_M$
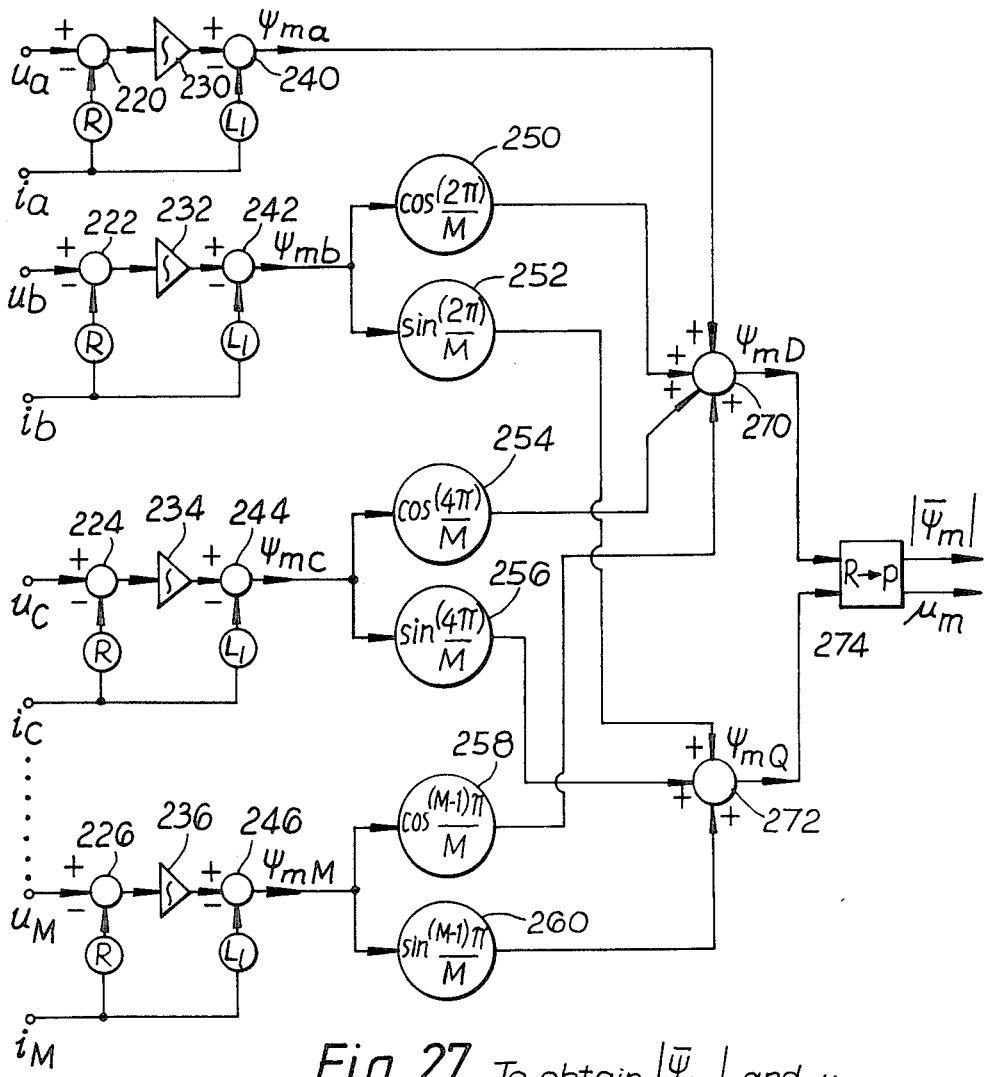
Fig. 27 To obtain $|\bar{\psi}_m|$ and $\mu_m$

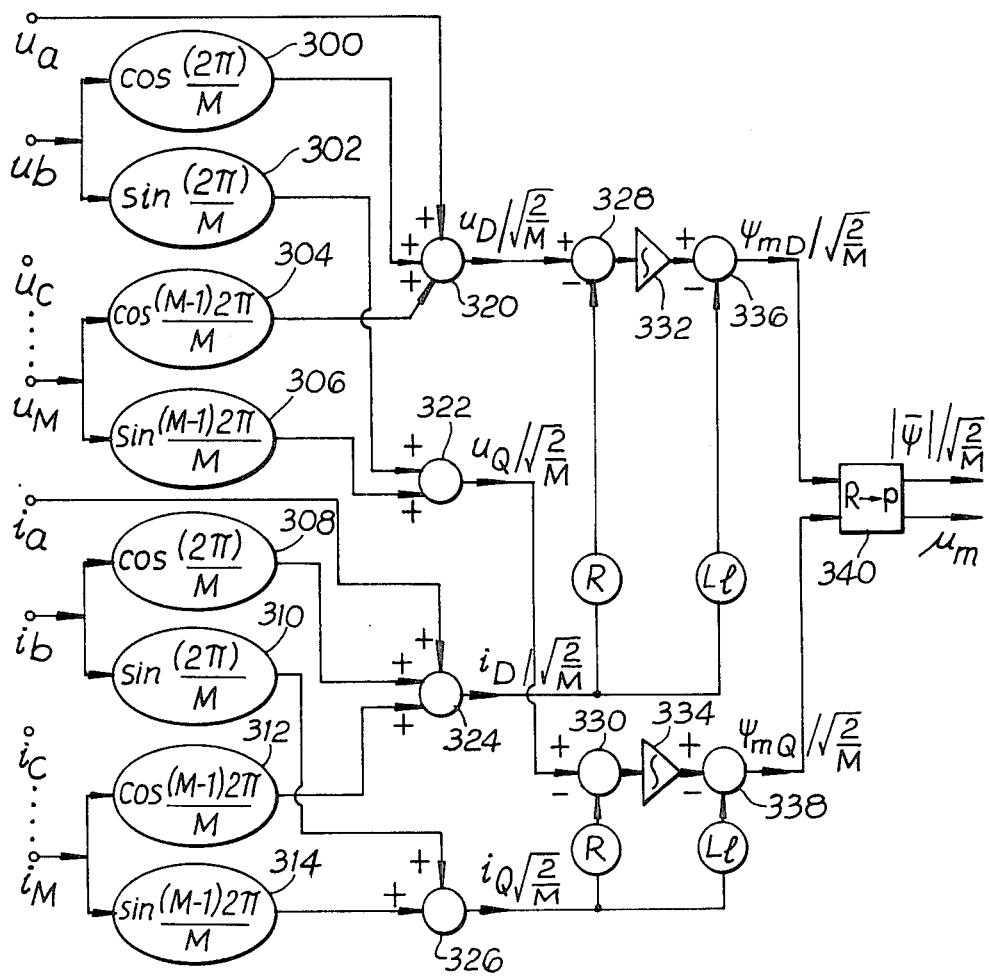
Fig. 28 To obtain $|\bar{\psi}|$ and $\mu_m$
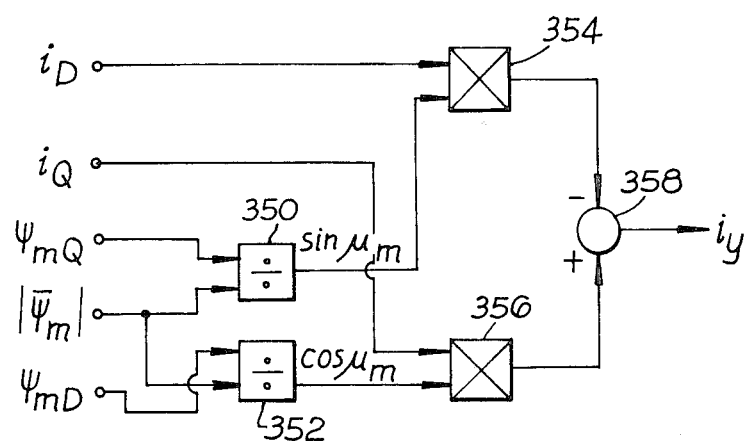
Fig. 29 Obtaining $i_y$

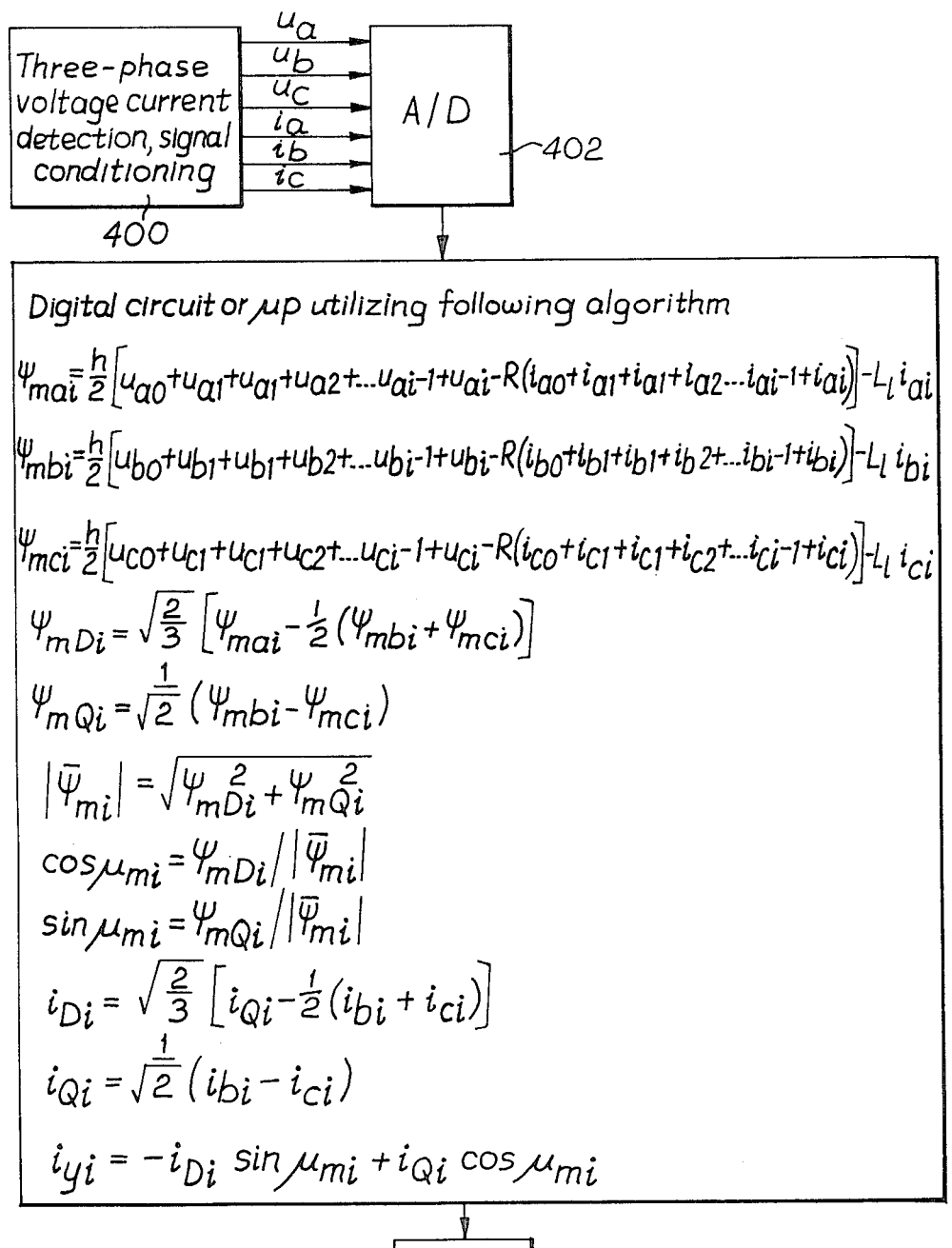
Fig. 30     $|\bar{\psi}_m|$; $i_y$; $\cos\mu_m$, $\sin\mu_m$

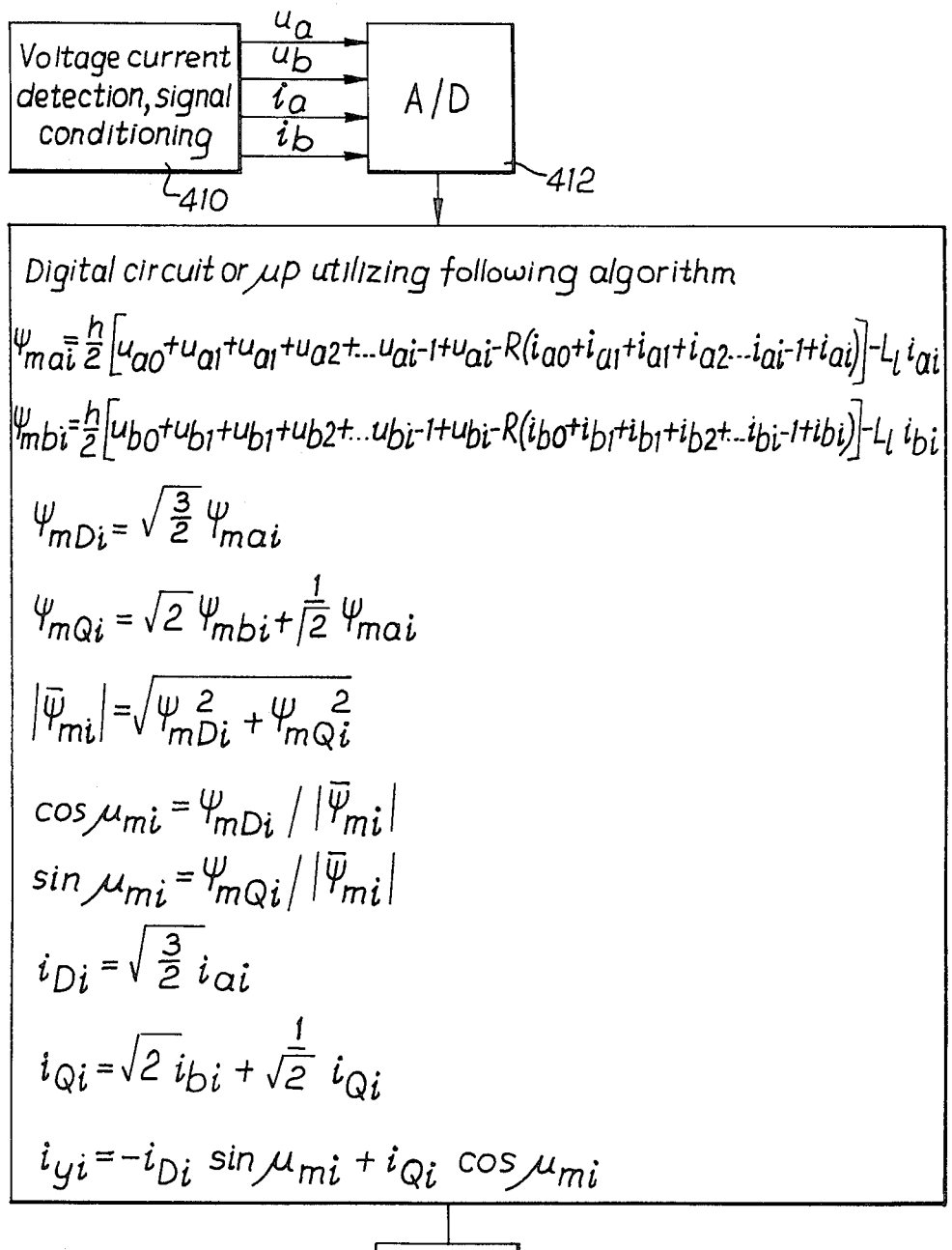
Fig. 31    $|\bar{\psi}_m|$; $i_y$; $\cos \mu_m$; $\sin \mu_m$

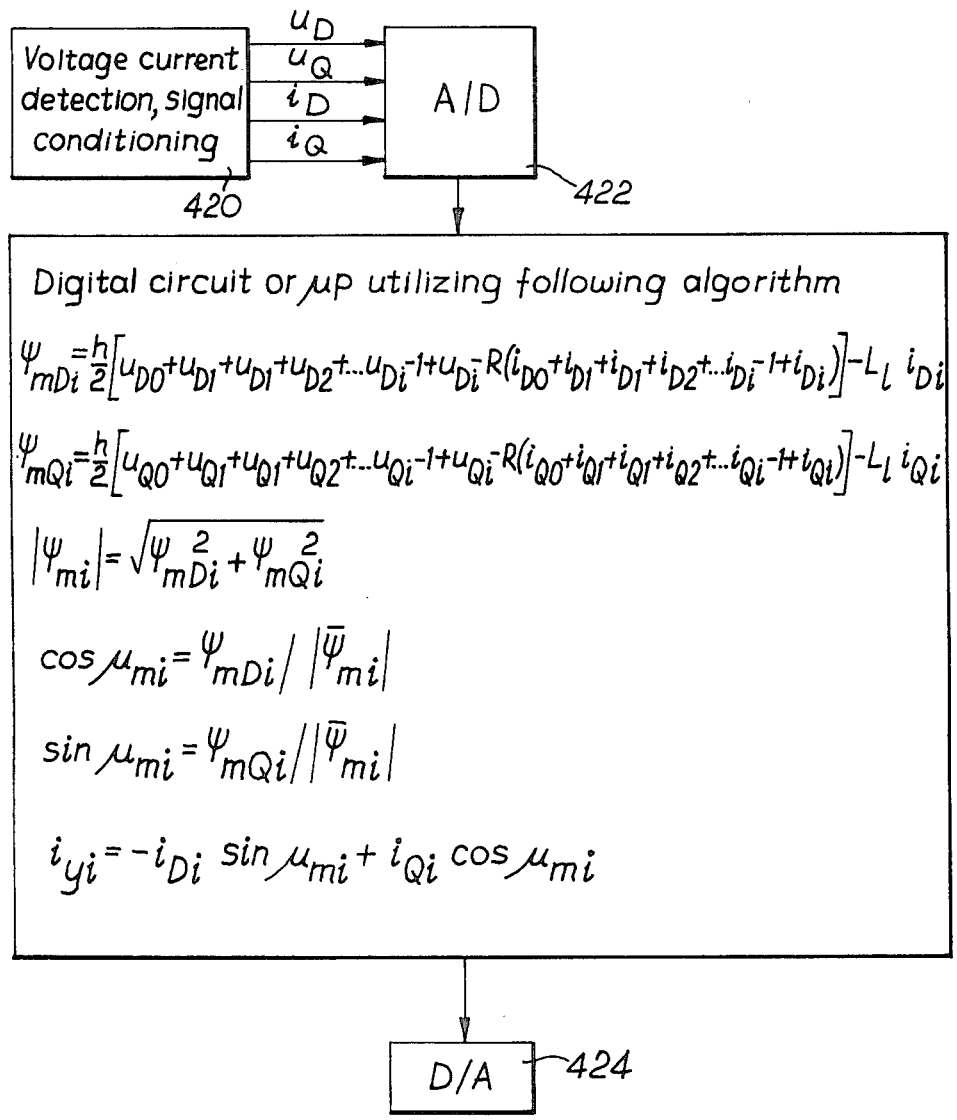
Fig. 32    $|\bar{\psi}_m|$; $i_y$; $\cos\mu_m$; $\sin\mu_m$

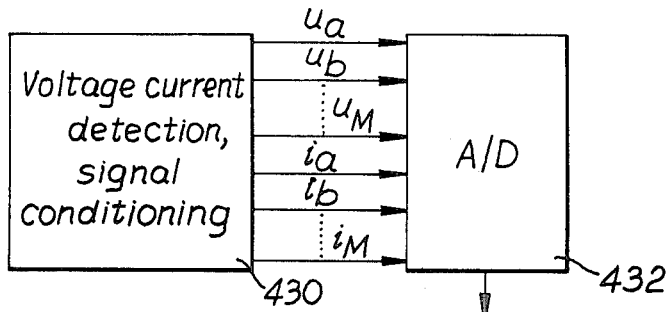

Digital circuit or μP utilizing following algorithm $$\psi_{mai} = \frac{h}{2}[u_{a0}+u_{a1}+u_{a1}+u_{a2}+...u_{ai-1}+u_{ai}-R(i_{a0}+i_{a1}+i_{a1}+i_{a2}+...i_{ai-1}+i_{ai})]-L_l i_{ai}$$

$$\psi_{mbi} = \frac{h}{2}[u_{b0}+u_{b1}+u_{b1}+u_{b2}+...u_{bi-1}+u_{bi}-R(i_{b0}+i_{b1}+i_{b1}+i_{b2}+...i_{bi-1}+i_{bi})]-L_l i_{ai}$$

$$\vdots$$

$$\psi_{mMi} = \frac{h}{2}[u_{m0}+u_{m1}+u_{m1}+u_{m2}+...u_{mi-1}+u_{mi}-R(i_{m0}+i_{m1}+i_{m1}+i_{m2}+...i_{mi-1}+i_{mi})]-L_l i_{ai}$$

$$\psi_{mDi} = (\psi_{mai}+\cos(\tfrac{2\pi}{M})\psi_{mbi}+...\cos[\tfrac{(M-1)2\pi}{M}]\psi_{mMi})\sqrt{\tfrac{2}{M}}$$

$$\psi_{mQi} = (\sin(\tfrac{2\pi}{M})\psi_{mbi}+\sin(\tfrac{2\pi}{m})\psi_{mai}+...\sin[\tfrac{(M-1)2\pi}{M}]\psi_{mM})\sqrt{\tfrac{2}{M}}$$

$$|\bar{\psi}_{mi}| = \sqrt{\psi_{mDi}^2 + \psi_{mQi}^2}$$

$$\cos\mu_{mi} = \psi_{mDi}/|\bar{\psi}_{mi}|$$

$$\sin\mu_{mi} = \psi_{mQi}/|\bar{\psi}_{mi}|$$

$$i_{Di} = \sqrt{\tfrac{2}{M}}(i_{ai}+\cos(\tfrac{2\pi}{M})i_{bi}+...\cos[\tfrac{(M-1)2\pi}{m}]i_{Mi})$$

$$i_{Qi} = \sqrt{\tfrac{2}{M}}(\sin(\tfrac{2\pi}{M})i_{bi}+...\sin[\tfrac{(M-1)2\pi}{M}]i_{Mi})$$

$$i_{yi} = -i_{Di}\sin\mu_{mi} + i_{Qi}\cos\mu_{mi}$$

Fig. 33    $|\bar{\psi}_m|$; $i_y$; $\cos\mu_m$; $\sin\mu_m$

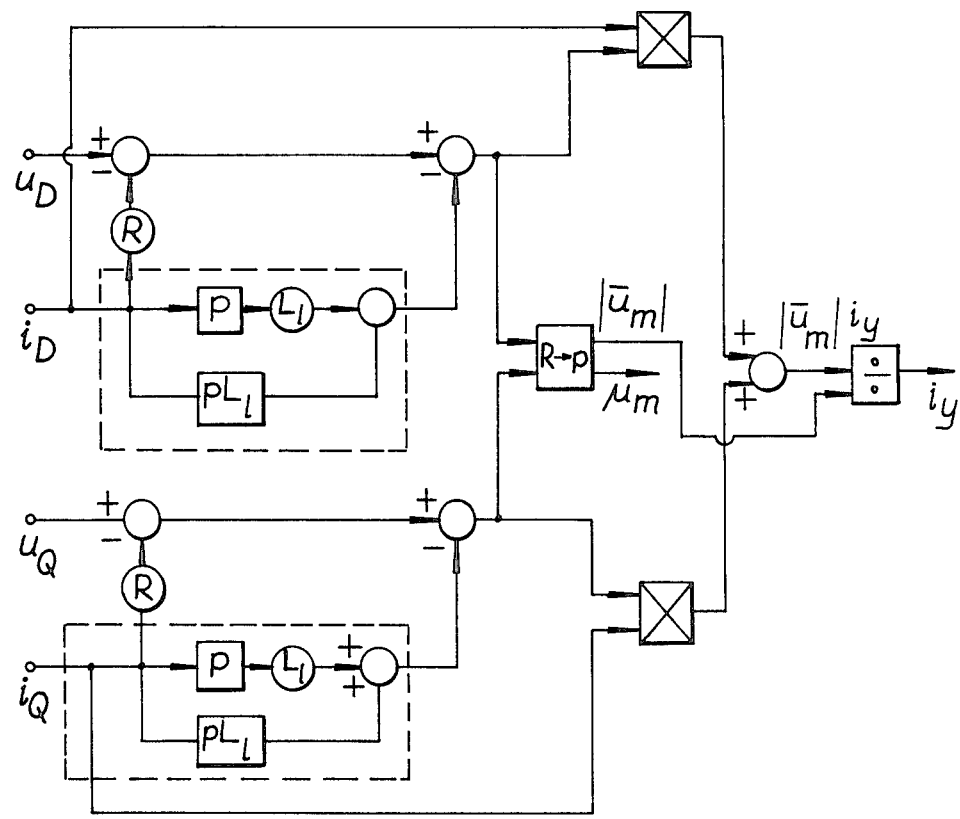
*Fig. 35* Obtaining $i_y$ and $\mu_m$ if $|\bar{\Psi}_m|$ = constant
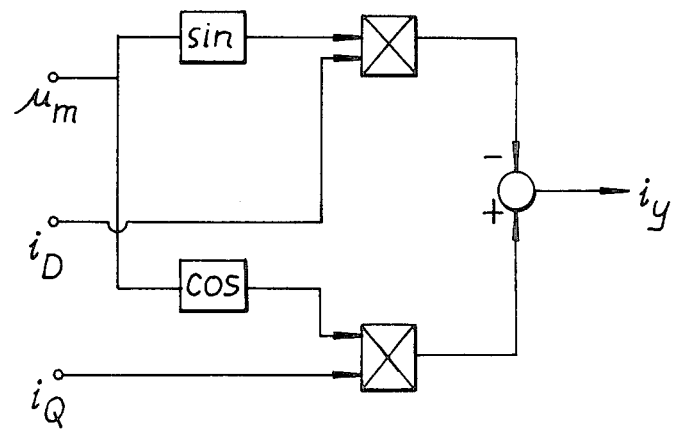
*Fig. 36* Obtaining $i_y$ from $\mu_m$, $i_D$, $i_Q$ (Shown in Fig. 17)

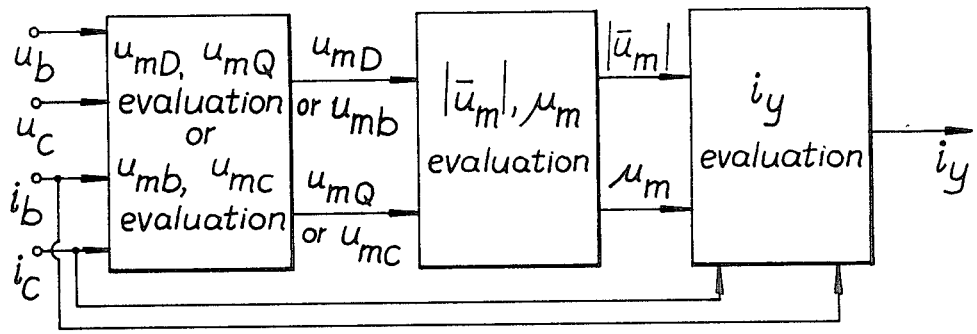
Fig. 37 Obtaining $\mu_m$, $i_y$, from $u_b$, $u_c$, $i_b$, $i_c$ if $|\bar{\Psi}_m|$=constant
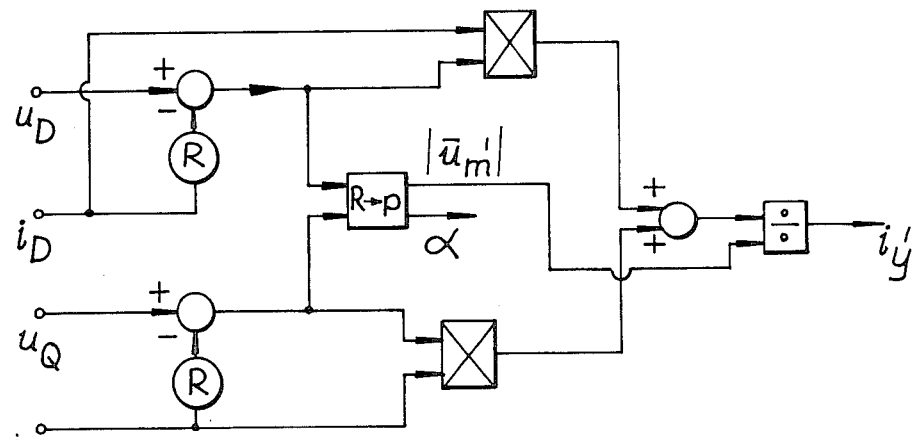
Fig. 38 Obtaining $i_y'$, $\alpha$ if $L_m|\bar{i}_m'|$= constant
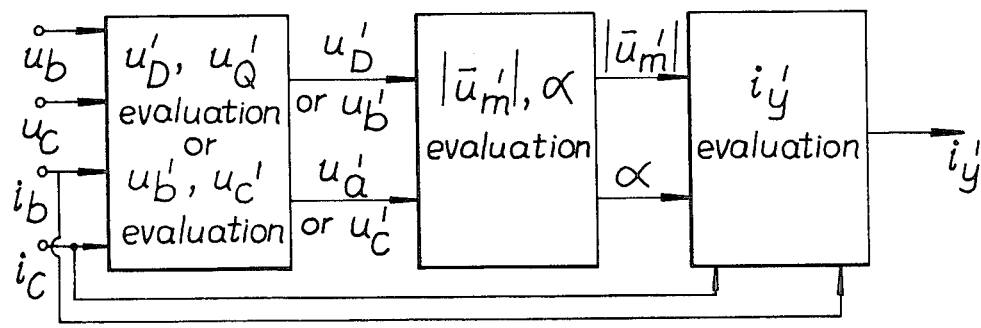
Fig. 39 Obtaining $\alpha$, $i_y'$ from $u_b$, $u_c$, $i_b$, $i_c$ if $L_m|\bar{i}_m'|$ =constant

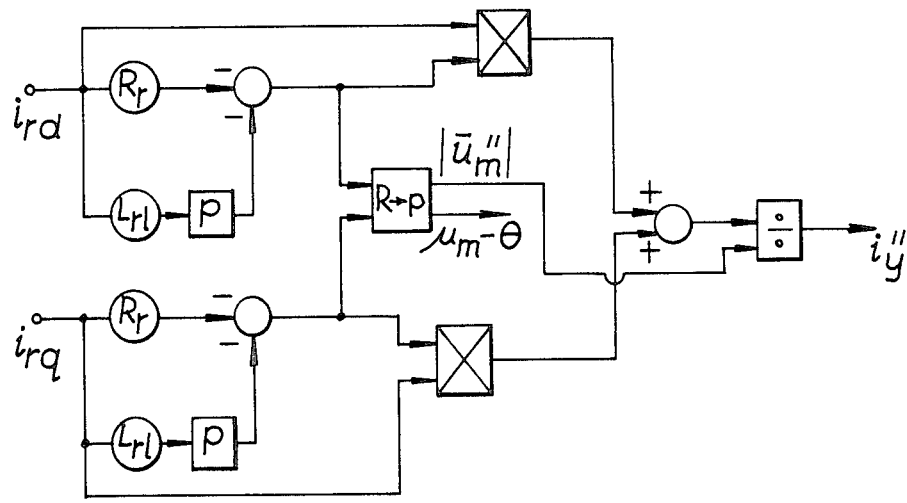
Fig. 40 Obtaining $i_y''$, $\mu_m-\theta$ if $|\bar{\Psi}_m''|$ = constant
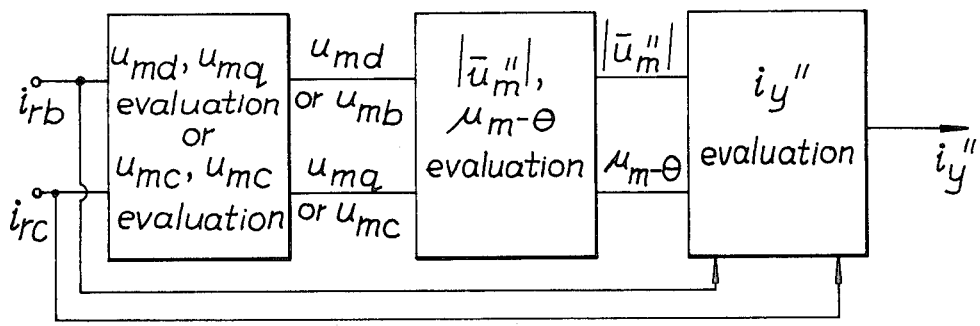
Fig. 41 Obtaining $\mu_m-\theta$, $i_y$ from $i_{rb}$, $i_{rc}$ if $|\bar{\Psi}_m''|$ = constant

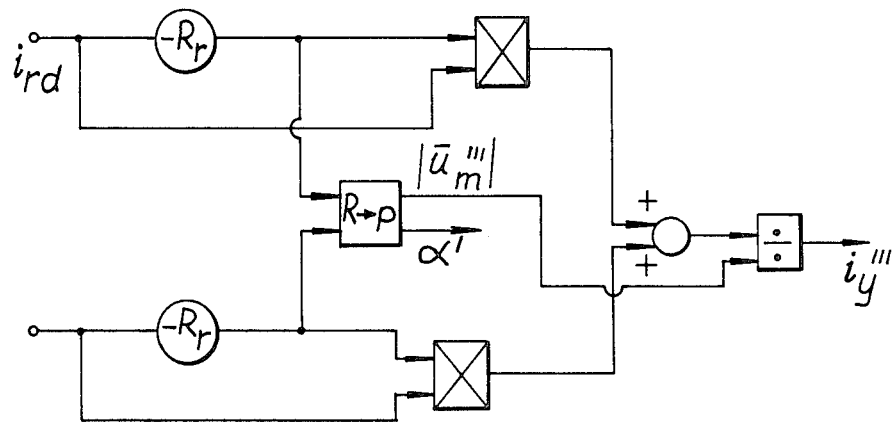
Fig. 42 Obtaining $i_y'''$, $\alpha'$ if $L_m|\bar{i}_m''|$ = constant
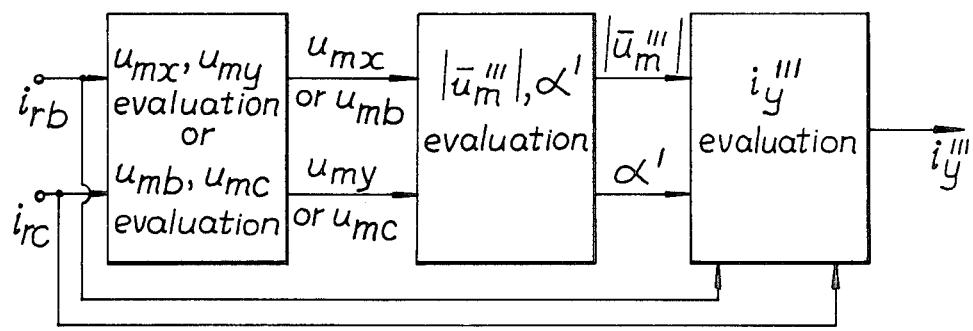
Fig. 43 Obtaining $i_y'''$, $\alpha'$ if $L_m|\bar{i}_m''|$ = constant

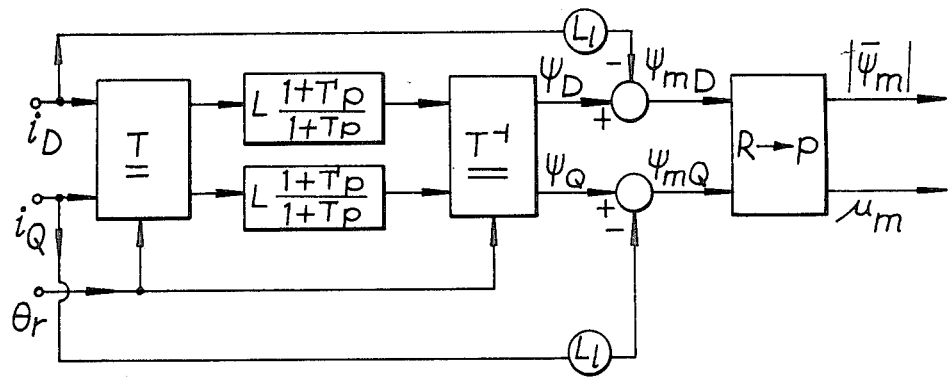
Fig.44 Obtaining $|\bar{\Psi}_m|, \mu_m$ from $i_D, i_Q, \theta_r$
under linear magnetic conditions
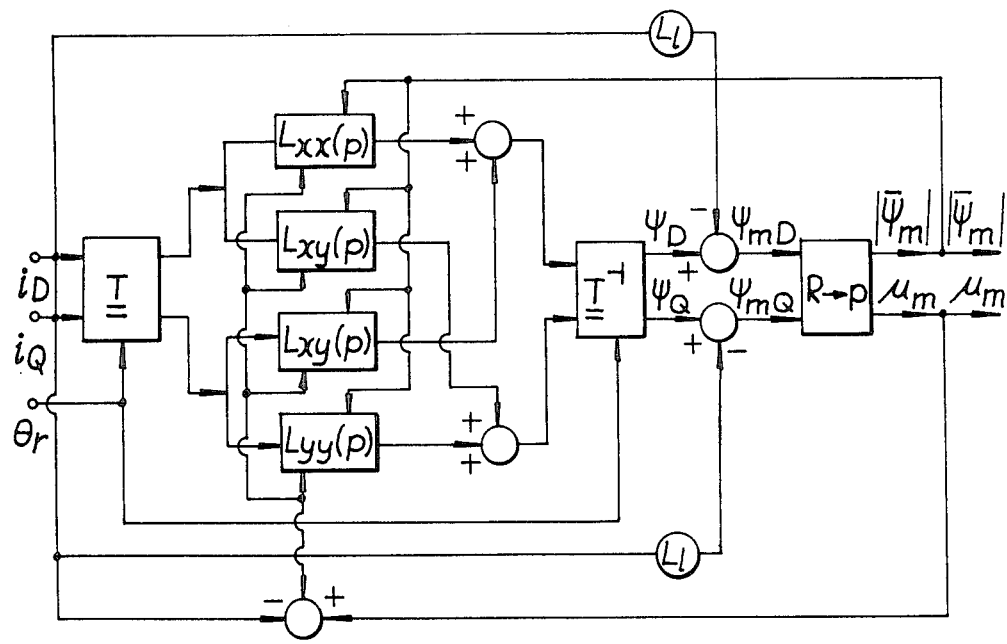
Fig.45 Obtaining $|\bar{\Psi}_m|, \mu_m$ from $i_D, i_Q, \theta_r$
under saturated conditions

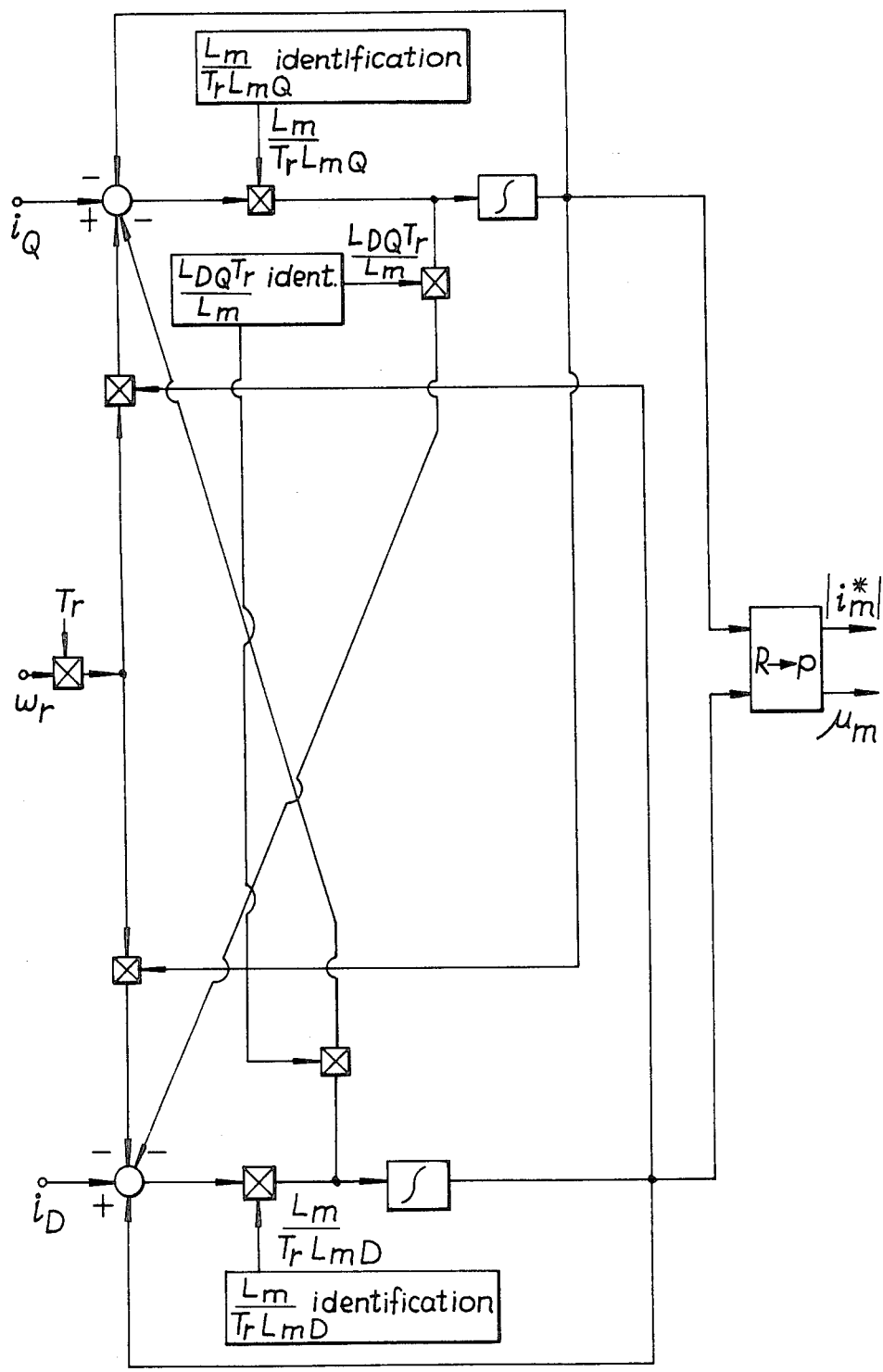
Fig. 46 Obtaining $|\bar{i}_m|$, $\mu_m$

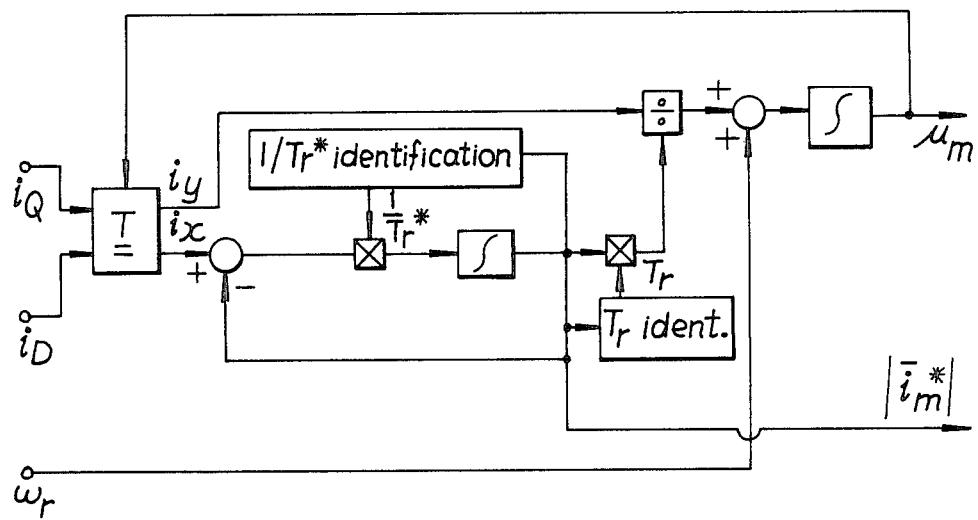
Fig. 47 Obtaining $|\bar{i}_m^*|, \mu_m$
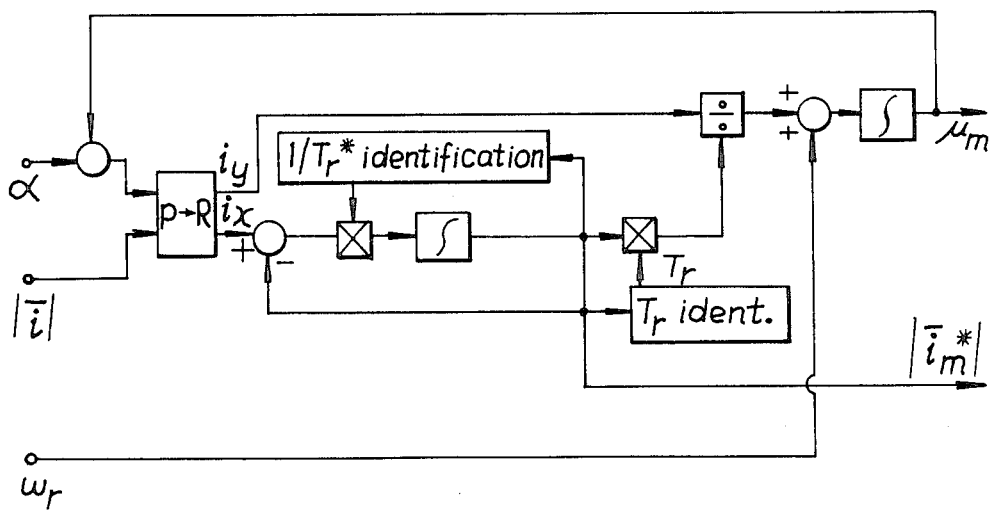
Fig. 48 Obtaining $|\bar{i}_m^*|, \mu_m$

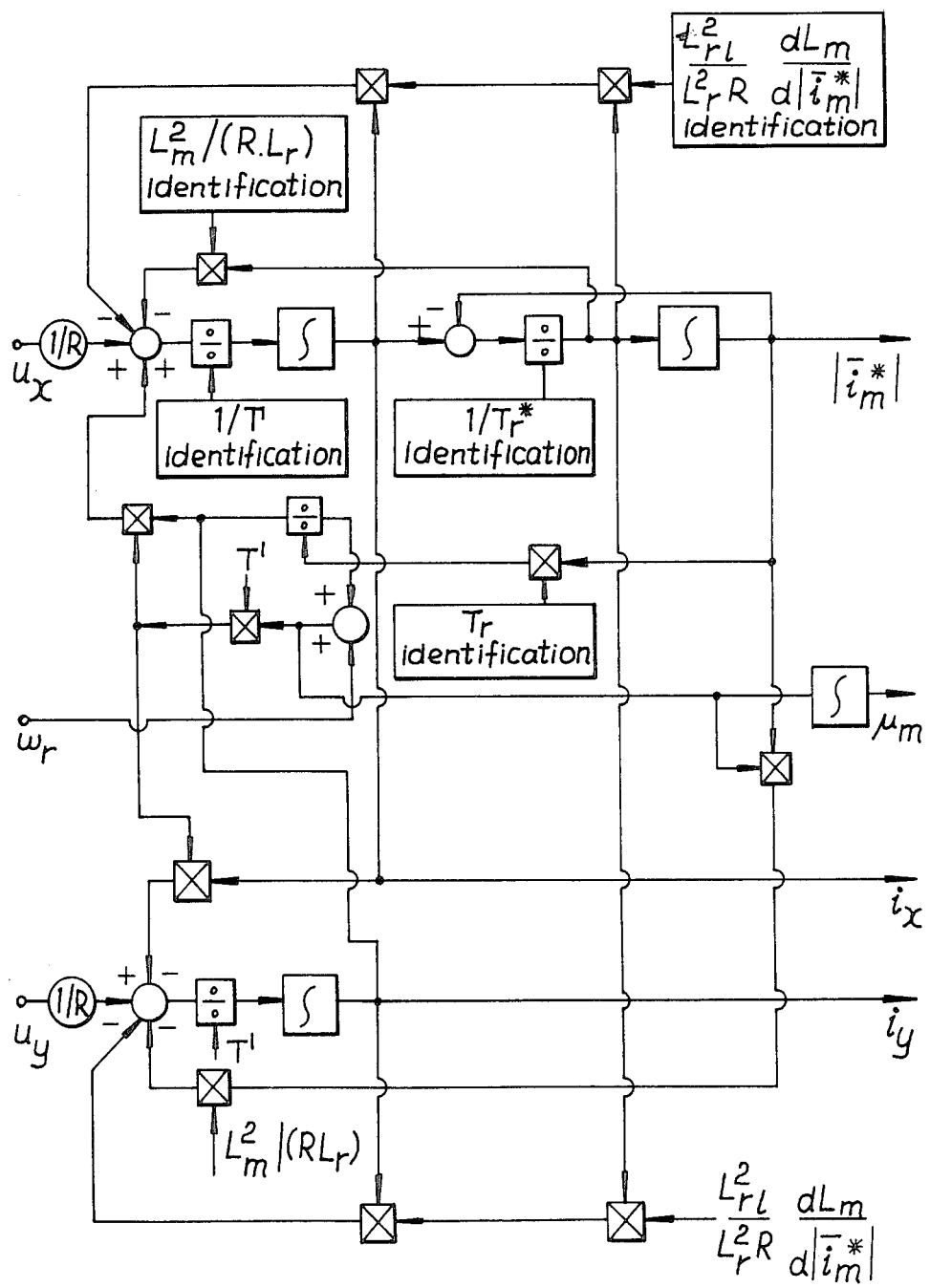
Fig. 49 Obtaining $|\bar{i}_m^*|, \mu_m, i_x, i_y$

VECTOR CONTROL SYSTEMS FOR MULTIPHASE A.C. MACHINES

BACKGROUND OF THE INVENTION

The present invention relates to control systems for multiphase a.c. machines, and more particularly to original processing systems for vector control of multiphase a.c. machines.

The main feature of main-flux-oriented control of M-phase a.c. machines is the transformation of the actual M-phase of (M−1)-phase (if M is uneven) and (M−2)-phase (if M is even) supply currents into orthogonal currents, one of which—a direct axis component—produces the main field and the other—a quadrature axis component—is a torque-producing current. The supply currents are controlled—in phase and magnitude—in such a way that the component producing the main flux and the torque producing component are controlled separately and thereby control the electromagnetic torque.

To perform the separation of the supply currents into the required two components, it is necessary to transform the stationary-axis supply-current components into two-axis current components of such a special reference frame that the direct axis of coaxial with the magnetising flux-linkage space vector.

Therefore, if in a stationary reference frame the M-phase magnetising flux linkage space vector is $$\overline{\psi}_m = |\overline{\psi}_m| e^{j\mu_m} \quad (1)$$

where $|\overline{\psi}_m|$ and $\mu_m$ are the modulus and space angle of the magnetising flux-linkage space vector, the two-axis components of the supply currents ($i_x$, $i_y$) in the special reference frame are obtained from $$\overline{i}' = i_x + ji_y = \overline{i}e^{-j\mu_m} = (i_D + ji_Q)e^{-j\mu_m} \quad (2)$$

where $i_D$ and $i_Q$ are the two-axis currents in the stationary reference frame.

Since the direct axis of the special reference frame is coaxial with the magnetising-current space vector, in the special reference frame the quadrature-axis component of the magnetising-current space vector is zero and the electromagnetic torque will be proportional to the modulus of the magnetising flux space vector and the quadrature axis component of the supply currents ($i_y$). Thus, the electromagnetic torque can be expressed as $$t_e \propto |\overline{\psi}_m| i_y \quad (3)$$

In a first known system disclosed in European Patent Application No. 0121792, a vector control method and system for a three-phase a.c. induction motor is described. In this control system it is necessary to measure the rotor angular frequency of the motor and to know a number of parameters of the motor to enable the controls signals to be calculated, and furthermore the effects of saturation are not incorporated. In the present invention, however, the effects of saturation are taken account of. This is particularly important because it leads to better decoupling of flux and torque producing current components.

In a second known system disclosed in U.K. Pat. No. 1542024, a vector control system is described using voltage and current transformers to monitor the input voltages and currents of a three-phase a.c. induction motor. The input currents are differentiated in this system, several integrators are used and no allowance is made for saturation of the leakage flux paths, thereby leading to errors in the control.

SUMMARY OF THE INVENTION

In the present invention, the above-mentioned errors introduced by the use of transformers and differentation of the input currents and subsequent integration are eliminated.

According to the first part of the present invention there is provided a control system for an M-phase a.c. machine including means for measuring the currents in at least (M−N) phases, where N=2 if M is even and N=1 if M is uneven, means for measuring the instantaneous values of the voltages in at least (M−N) phases and means for obtaining control signals for alteration of the input voltage and/or current to the motor to maintain the motor in a substantially optimum condition. Preferably the means for calculating the control signals does not include means requiring integration of the advance of an input current.

In a preferred form the control signals generated are $|\overline{\psi}_m|$, $i_y$ and $\mu_m$ wherein $|\overline{\psi}_m|$ is the modulus of a magnetising-flux-linkage space vector, $i_y$ is the quadrature axis component of the stator currents and $\mu_m$ is the space angl of the magnetising flux-linkage space vector.

The means for measuring the currents in each phase of the M phases preferably includes a plurality of current shunts or Hall devices, and the means for measuring the voltages in each phase of the M phases preferably includes a voltage divider network for each phase.

In the present invention, to eliminate errors which arise in transformers due to saturation at low frequency operation, transformers are not used. In a first embodiment differentiation of the input or transformed current components is not performed, since it has been realised that in a later stage, although in a concealed form, integration of such a function would have to be performed where the derivative of these currents would appear. Therefore a circuit included for such a differentiation leads to unnecessary complications, and introduces unnecessary errors. On the other hand, if the differentiated current components are multiplied by leakage inductances, the leakage voltage drops obtained do not contain the correct effects of leakage saturation, even if multiplication is performed by the appropriate saturated values of the leakage inductances. Thus the present invention eliminates the errors due to the differentiation process described above. In the second embodiment of the present invention, systems are described for obtaining $i_y$ and $\mu_m$, which do not contain integrators. In the third embodiment, systems are described which incorporate the effects of magnetic saturation and produce accurate values of all the signals necessary for vector control, even at low frequency operation.

BRIEF DESCRIPTION OF THE DRAWINGS

Embodiments of the present invention will now be described, by way of example, with reference to the accompanying drawings, in which:

FIG. 1 shows a control system for an electric machine;

FIG. 2 shows one possible system according to the present invention for monitoring voltages and currents of a three-phase a.c. machine;

FIG. 3 shows a first circuit for obtaining control signals for a three-phase a.c. machine from the three supply voltages and three supply currents;

FIG. 4 shows a second circuit for obtaining control signals for a three-phase a.c. machine from two of the three supply voltages and two of the three supply currents;

FIG. 5 shows a third circuit for obtaining control signals for a three-phase a.c. machine from the quadrature-phase supply voltages and currents;

FIG. 6 shows a first circuit for obtaining a further control signal for a three-phase a.c. machine from two of the three supply currents and the cosine and sine of $\mu_m$;

FIG. 7 shows a second circuit for obtaining a further control signal for a three-phase a.c. machine from two supply currents and the quadrature-phase components and modulus of the magnetising-flux-linkage space vector;

FIG. 8 shows a circuit for use with a three-phase A.C. machine for obtaining control signals from the supply voltages and currents for use in $\bar{i}_m'$-oriented control;

FIG. 9 shows a similar circuit to FIG. 8 but using only two voltages and currents;

FIG. 10 shows an implementation to obtain $|\bar{i}_m'|$ using only two integrators;

FIG. 14 shows a possible analogue implementation of a circuit which uses three monitored rotor currents for $\psi_m''$ oriented control of a machine;

FIG. 15 shows a similar circuit to FIG. 14 using only two rotor currents;

FIG. 16 shows a circuit for $\bar{\psi}_m''$ oriented control of a machine utilising the two axis components $i_{rd}$, $i_{rq}$ of the rotor currents;

FIGS. 17, 18 and 19 show possible digital implentations of $\bar{\psi}_m''$ oriented control of a machine;

FIG. 20 shows a possible analogue implementation of a circuit for $\bar{i}_m''$ oriented control of a machine using three rotor currents;

FIG. 21 shows a similar circuit to FIG. 20 using only two rotor currents;

FIG. 22 shows a circuit for $\bar{i}_m''$ oriented control of a machine utilising the two area components $i_{rd}$, $i_{rq}$ of the rotor currents;

FIG. 26 shows a further possible system according to the present invention for monitoring voltages and currents of an M-phase a.c. machine;

FIG. 27 shows a first circuit for obtaining control signals for an M-phase a.c. machine from the voltages and currents obtained in the system of FIG. 26;

FIG. 28 shows a second circuit for obtaining control signals for an M-phase a.c. machine from the voltages and currents obtained in the system of FIG. 26;

FIG. 29 shows a circuit for obtaining a further control signal for an M-phase a.c. machine from the quadrature-axis components of the currents and the modulus and quadrature-axis components of the magnetising flux linkage space vector;

FIG. 30 shows schematically a digital system for obtaining control signals for a three-phase a.c. machine from measured voltages and currents;

FIG. 31 shows schematically the system of FIG. 30 modified to use only selected voltages and currents;

FIG. 32 shows schematically a digital system for obtaining control signals for a quadrature-phase a.c. machine from measured voltages and currents;

FIG. 33 shows schematically a digital system for obtaining control signals for an M-phase a.c. machine from measured voltages and currents;

FIG. 35 shows an analogue circuit for obtaining signals necessary for field oriented control of a machine by using an integrator-free implementation according to the present invention;

FIG. 36 shows an alternative analogue circuit for obtaining signals necessary for field oriented control of a machine by using an integrator-free implementation;

FIG. 37 shows a further alternative analogue circuit for obtaining control signals for field oriented control of a machine by using an integrator free implementation using only two terminal voltages and two terminal currents of a semi-four phase or three phase machine;

FIG. 38 shows an analogue circuit for obtaining $i'_y$, $\alpha$ from two input voltages and two input current quantities;

FIG. 39 shows a circuit for obtaining $i_y$, $\alpha$ which can be implemented in analogue, digital or hybrid techniques;

FIG. 40 shows an analogue circuit for obtaining the imaginary axis component of the rotor currents $i_y''$ and the space angle $\mu_m - \theta$;

FIG. 41 shows a circuit for obtaining the imaginary axis component of the motor currents $i_y''$ and the space angle $\mu_m - \theta$ using analogue, digital or hybrid techniques;

FIG. 42 shows an analogue circuit for obtaining the imaginary axis component of the rotor current expressed in a special reference frame and the space angle $\alpha'$ for the control of a machine according to the present invention; and FIG. 43 shows a circuit for obtaining the imaginary axis component of the rotor current expressed in a special reference frame and the space angle $\alpha'$ for the control of a machine which can be formulated using analogue, digital or hybrid techniques;

FIG. 44 shows a circuit for obtaining the modulus and space angle of the magnetising flux vector respectively using analogue, digital or hybrid techniques;

FIG. 45 shows a circuit for obtaining $|\bar{\psi}_m|$ and $\mu_m$, which can be implemented by analogue, digital or hybrid techniques;

FIG. 46 shows a circuit to obtain the modulus and space angle of a modified magnetising current vector respectively, using analogue, digital or hybrid techniques;

FIG. 47 shows a circuit to obtain $|\bar{i}_m*|$ and $\mu_m$, using analogue, digital or hybrid techniques;

FIG. 48 shows a circuit to obtain $|\bar{i}_m*|$ and $\mu_m$, using analogue, digital or hybrid techniques;

FIG. 49 shows a circuit for obtaining $|\bar{i}_m*|$, $\mu_m$, $i_x$ and $i_y$ using analogue, digital, or hybrid techniques.

DETAILED DESCRIPTION OF THE PREFERRED EMBODIMENTS

Figure 11:
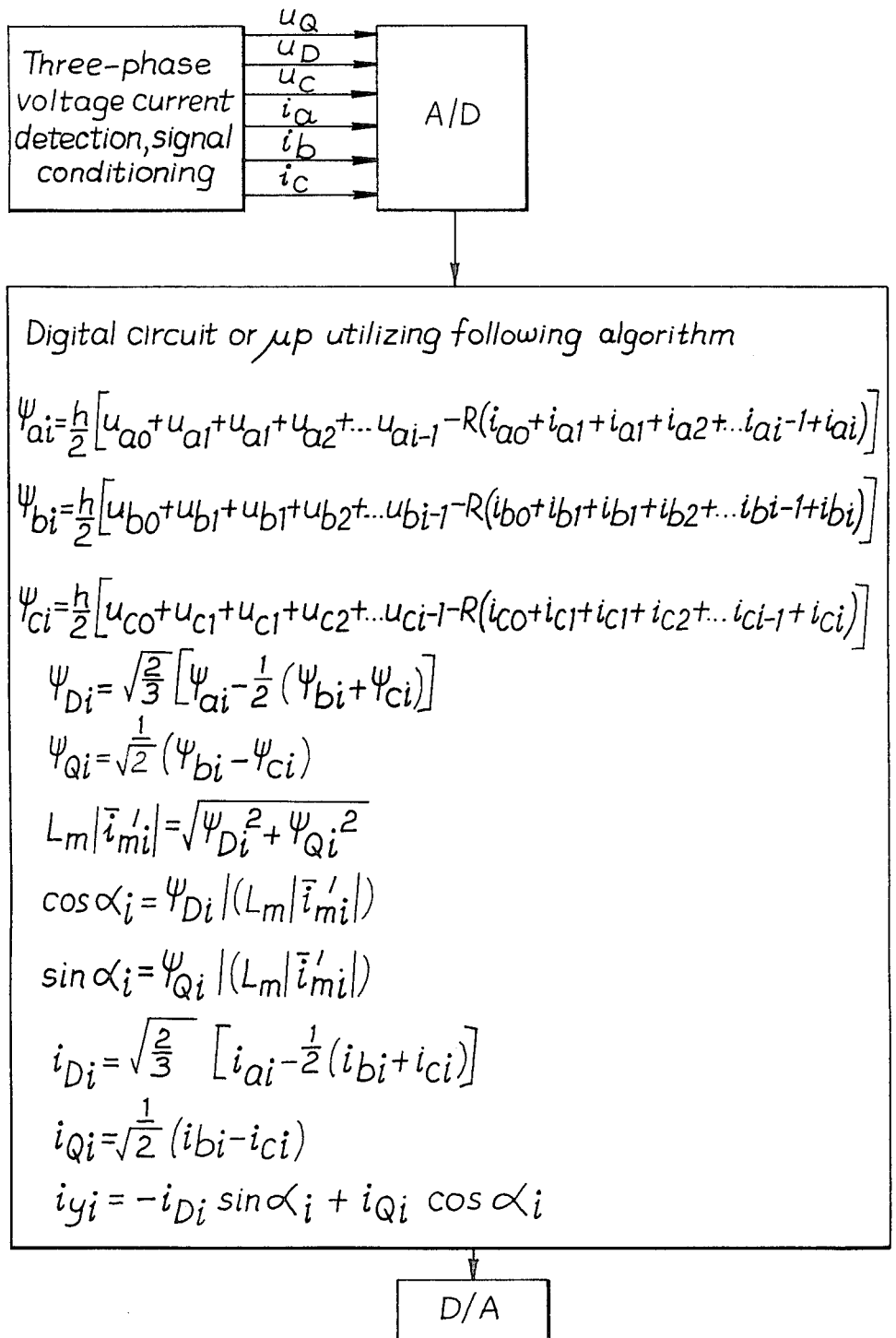
FIGS. 11, 12 and 13 show digital systems for obtaining the control quantities as described with reference to FIGS. 8 to 10.

1. Circuits which can be used with quadrature-phase and three-phase a.c. machines and which require integration 1.1 $\psi_m$-oriented control With reference now to FIG. 1, a control system is shown for a voltage-fed three-phase a.c. machine 10 including a convertor circuit 12 which is operable to change the magnitude and frequencies of the input voltages supplied to the machine on instructions from a control circuit 14. The supply to the machine on lines 16 is therefore modified in order to maintain the machine 10 in an optimal condition under all normal load conditions imposed on it by a variable mechanical load 18 connected to the machine for example via a shaft 20. In general, a Model Reference Adaptive Control System is used, which incorporates parameter identifier circuits, which are driven by error signals obtained from the difference between machine output signals and output signals of the mathematical model of the machine.

The control circuit 14 generates the values $|\overline{\psi}_m|$; $i_y$ and $\mu_m$ which are used as input quantities to convertor circuit 12 to control the magnitude and frequency of the voltages supplied to the motor. The required values are calculated from the monitored instantaneous voltages and currents present at the terminals of the machine and using the resistance value R of a winding and the value of leakage inductance per phase both of which values need to be monitored by parameter identifier circuits or known for each machine with which the control circuit is associated.

In the case of the three-phase machine of FIG. 1, the phase voltages can be monitored even in the case of a star-connection, where the neutral point is unavailable. FIG. 2 shows the application of voltage divider networks, and the instantaneous values of the phase voltages $u_a$, $u_b$, $u_c$ are obtained across the terminals of resistors r. These voltages are then fed into respective isolation amplifiers 30, 32, 34 which have high input impedances. Currents $i_a$, $i_b$, $i_c$ are also monitored by current shunts 36, 38, 40 as shown in FIG. 2. Therefore, three voltage signals are obtained which are proportional to $i_a$, $i_b$, $i_c$. These are fed into isolation amplifiers 42, 44, 46.

To obtain $|\overline{\psi}_m|$ and $\mu_m$, three techniques can be used as shown in FIGS. 3, 4 and 5. FIG. 3 shows a circuit which uses all the three voltages ($u_a$, $u_b$, $u_c$) and currents ($i_a$, $i_b$, $i_c$) of FIG. 2. In all of the phases the ohmic voltages are subtracted from the input voltages in respective subtraction circuits 50, 52, 54, R being the resistance of one of the motor windings. It can be constant or can vary with temperature, and it can be obtained from preliminary tests or can be obtained from on-line signal processing. Throughout the specification the symbols R and $L_l$ in small circles 51 and 57 etc. respectively represent proportional multipliers in which the input signals are multiplied by the quantity shown in the circle. Thus, for example, the input of circuit 51 is $i_a$ and its output is R.$i_a$. etc. The voltages obtained are then integrated in respective integrators 56, 58, 60 in all of the phases, and the leakage flux linkages are subtracted from them in respective subtraction circuits 62, 64, 66. In FIG. 3 $L_l$ is the leakage inductance per phase, and it is a constant if linear magnetising conditions are assumed, but is a function of the currents under saturated conditions. The resulting magnetising flux linkages are corrected by the required constants and are added or subtracted by elements 68–78 to give the quadrature axis magnetising-flux-linkage components ($\psi_{MD}$, $\psi_{MQ}$). These are fed into a rectangular-to-polar converter 80 and on the output terminals two voltages are obtained which are proportional to $|\overline{\psi}_m|$ and $\mu_m$. Finally, sin $\mu_m$ and cos $\mu_m$ are obtained by using operational amplifiers 82, 84 which perform trignometric conversions. It must be noted that subtraction and integration can be performed in one step by using differential integrators.

FIG. 4 shows a simpler construction, where, when there are no zero-sequence voltages and currents, only two voltages $u_a$, $u_b$ and two currents $i_a$, $i_b$ need to be used. The ohmic voltage drops ($i_a$R, $i_b$R) are again substracted in circuits 100, 102 from the terminal voltages and the new voltages obtained are integrated in integrators 106, 108. From these, the leakage flux linkages are subtracted (L represents the leakage inductance) in circuits 110, 112. The resulting $\psi_{ma}$ and $\psi_{mb}$ magnetising flux linkages of the "a" and "b" phases are then converted by the appropriate constants shown in circuits 114, 116, 118, 120, to two-axis components of the magnetising-flux-linkage space vectors which are then fed into a rectangular-to-polar converter 122. Thus, two signals are obtained, which are proportional to $|\overline{\psi}_m|$ and $\mu_m$. The modulus of the magnetising current space vector is obtained from $|\overline{\psi}_m|$ by multiplying $|\overline{\psi}_m|$ by $1/L_m$ in circuit 124, where $L_m$ is the magnetising inductance of the machine. The functions sin $\mu_m$, cos $\mu_m$ also are obtained, by using operational amplifiers 126, 128 which are suitable for performing trigonometric conversion.

In three-phase circuits the two-axis components of the voltages and currents can be obtained by known techniques, e.g., the Scott-connection or the Le-Blanc connection can be used for obtaining the two-axis voltage components, but it is possible to use connections which avoid the use of transformers. Assuming that the two-axis components are known, FIG. 5 shows a circuit arrangement where $|\overline{\psi}_m|$, $\mu_m$, $|\overline{i}_m|$ and sin $\mu_m$, cos $\mu_m$ are obtained. The ohmic voltage drops are subtracted from the terminal voltages $u_D$, $u_Q$ in circuits 130, 132 and integration in circuits 134, 136 gives $\psi_D$, $\psi_Q$. These are reduced in circuits 138, 140 by the leakage flux linkages ($L_l$ $i_D$, $L_l$ $i_Q$) and $\psi_{mD}$ $\psi_{mQ}$ are obtained. Rectangular-to-Polar conversion in circuit 142 gives $|\overline{\psi}_m|$, $\mu_m$ and $|\overline{i}_m|$ is obtained from $|\overline{\psi}_m|$ by multiplying by $1/L_m$ in circuit 144. sin $\mu_m$ and cos $\mu_m$ are obtained by using amplifiers 146, 148 suitable for performing trigonometric conversion. It is important to note that for a quadrature-phase machine $u_D$, $u_Q$ $i_D$, $i_Q$ are non-transformed, actual values, thus for such a two-phase machine it is the connection shown in FIG. 5 which should be used.

It has been shown in Eqn. (3) that the electromagnetic torque is proportional to $|\overline{\psi}_m|$ and $i_y$. To obtain $i_y$, it is necessary to perform a transformation of the stationary-axis currents [see eqn. (2)]. FIG. 6 shows such a circuit, where the inputs are $i_a$ and $i_b$ and sin $\mu_m$ and cos $\mu_m$. The latter two values can be obtained from FIGS. 3, 4 or 5. In FIG. 6, two multipliers 150, 152 are used to multiply $i_Q$ by sin $\mu_m$ and $i_D$ by cos $\mu_m$, $i_D$ and $i_Q$ being obtained from $i_a$ and $i_b$ after multiplying in circuits 154, 156, 158 by appropriate constants. The difference of the outputs of the multipliers taken by 160 gives $i_y$. For a true quadrature-phase machine the input currents are $i_D$ and $i_Q$ and that part of the circuit which transforms $i_D$, $i_Q$, can be omitted.

If in FIGS. 3, 4, 5 the circuits which perform trigonometric manipulations are omitted, it is still possible to obtain $i_y$ if $i_a$, $i_b$ are known, and if $|\psi_m|$, $\psi_{mD}$, $\psi_{mQ}$ which appear in FIGS. 3, 4, 5 are also input values.

Thus, FIG. 7 shows a circuit, where cos $\mu_m$ and sin $\mu_m$ are obtained after performing division in dividers 162, 164. Finally, multipliers 166, 168 are used to obtain $i_Q$ cos $\mu_m$ and $i_D$ sin $\mu_m$, and on the ouput terminal of 170 their difference $i_y$ appears. For a true quadrature-phase machine, the input currents are $i_D$ and $i_Q$ and constant multiplying circuits 172, 174, 176 which transform $i_a$, $i_b$ into $i_D$, $i_Q$ can be omitted.

1.2 $\bar{i}_m'$—oriented control

In the above implementations, it is necessary to know two machine parameters, these are the resistance and the leakage inductance of a supply-winding. However, since the leakage flux linkages do not contribute to electromagnetic torque production, there must exist such a scheme, which can be used for fast control of the electromagnetic torque, and where it is not necessary to know any leakage parameters, such as the stator leakage inductance. In this section it is shown that if a special modified magnetising current ($\bar{i}_m'$) oriented control is used, then the only machine parameter which has to be known is the stator resistance.

It is the main feature of such a modified magnetising current control that the actual phase-variable supply currents are transformed into such orthogonal current components, one of which, the direct-axis current component, produces a field which magnetises the stator, and the other, a quadrature-axis current component, is the electromagnetic-torque producing current component. The supply currents are controlled in phase and magnitude in such a way that the component which produces the stator magnetisation and the electromagnetic-torque producing component are controlled separately.

To perform the separation of the supply currents into the required two component currents, it is necessary to transform the stationary-axis supply-current components into two-axis current components of such a special reference frame where the real-axis (the direct axis) is coaxial with the special modified magnetising current ($\bar{i}_m'$).

Therefore, if in the stationary reference frame the special modified magnetising current is $$\bar{i}_m' = |\bar{i}_m'| e^{j\alpha} \quad (4)$$

where $|\bar{i}_m'|$ and $\alpha$ are the modulus and space angle of the modified magnetising-current space vector, the two-axis components of the supply currents ($i_x'$, $i_y'$) in the special reference frame are obtained by considering $$\bar{i}' = i_x' + ji_y' = \bar{i}e^{-j\alpha} = (i_D + ji_Q)e^{-j\alpha} \quad (5)$$

where $i_D$ and $i_Q$ are the two-axis currents in the stationary reference frame.

Since the real-axis of the special $\bar{i}_m'$-oriented reference frame is coaxial with the modified magnetising current space vector, in the special reference frame the imaginary-axis component of the modified magnetising current space vector is zero and the electromagnetic torque will be proportional to the modulus of the modified magnetising current space vector and the quadrature-axis component of the supply currents. Thus, the electromagnetic torque can be expressed as $$t_e \alpha |\bar{i}_m'| i_y \quad (6)$$

In Eqn. (6) the proportionality symbol appears, and Eqn. (6) is valid under linear and saturated magnetic conditions too. However, since the accurate value of $t_e$ is obtained by multiplying $|\bar{i}_m'|$y by a constant and also by the value of the magnetising inductance, it follows that under linear magnetic conditions, where the magnetising inductance is constant, the proportionality factor is a real constant, and under saturated conditions, the proportionality factor contains a real constant and the magnetising inductance, where the latter quantity takes fixed values at specific values of magnetisation.

In the case of three-phase machines, techniques will now be presented where the supply voltages and currents are monitored and $|\bar{i}_m'|$ and $\alpha$ are obtained.

FIG. 8 shows a possible analogue implementation, which uses all the three supply voltages ($u_a$, $u_b$, $u_c$) and supply currents ($i_a$, $i_b$, $i_c$). In all three phases the ohmic voltages are substracted from the supply voltages in respective subtraction circuits, R being the resistance of one phase winding on the supply-side of the machine. The value of R can be constant or can vary with temperature, and it can be obtained from preliminary tests or can be obtained by on-line signal processing. The symbols in the small circles represent proportional multiplication.

The difference of the input voltages and ohmic drops are integrated in respective integrators in all of the phases. The resulting flux linkages are connected by the required constants and are added or subtracted to give the real and imaginary-axes components of $L_m\bar{i}_m'$. These two-axis components are fed into a rectangular-to-polar converter, or into another device, on whose output two quantities are obtained, which are proportional to $L_m|\bar{i}_m'|$ and $\alpha$. Since the electromagnetic torque is equal to a real constant multiplied by $L_m|\bar{i}_m'|$ and the quadrature-axis component of the supply currents in the special reference frame, it is now necessary to know the value of $L_m$. Thus it can be seen that for the $\bar{i}_m'$-oriented control it is only necessary to know one machine parameter (R).

A similar circuit is shown in FIG. 9, however, only two voltages $u_a$, $u_b$ and two currents $i_a$, $i_b$ are monitored. The ohmic voltage drops are subtracted from the supply voltages and the new voltages obtained are integrated. The integrated quantities are then multiplied by appropriate constants and the real and imaginary-axes components of $L_m\bar{i}_m'$ are obtained on the input terminals of a device, which can be a rectangular-to-polar converter or another converter, on whose output terminals signals proportional to $L_m|\bar{i}_m'|$ and $\alpha$ are present.

Assuming that the two-axis components of the three-phase supply voltages $u_D$, $u_Q$ and currents $i_D$, $i_Q$ are determined—from the monitored three-phase quantities—FIG. 10 shows an implementation which uses two integrators on whose input $u_D$, $u_Q$, $i_D$, $i_Q$ are present and on the output terminals signals proportional to $L_m|\bar{i}_m'|$ and $\alpha$ appear. It should be noted that for a true quadrature-phase (semi-four-phase) machine $u_D$, $u_Q$, $i_D$, $i_Q$ are actual, non-transformed, phase-variable quantities, thus for such a machine it is the circuit shown in FIG. 10 which should be used.

It has been shown in Eqn. (5) that the electromagnetic torque is proportional to $|\bar{i}_m'|$ and $i_y'$. obtain $i_y'$, it is necessary to perform a transformation of the stationary-axis currents [see Eqn. (5)]. If a circuit similar to that shown in FIG. 6 is used, but on the input terminals cos $\alpha$, $i_a$, $i_b$ sin $\alpha$ are present, on the output terminal $i_y'$ will appear. Similarly, a circuit, which is similar to that shown in FIG. 7 can be used if on the input terminals of the circuit shown in FIG. 7 $i_a$, $i_b$, $\psi_Q$, $L_m|\bar{i}_m'|$, $\psi_D$ are present, where $\psi_Q$, $\psi_D$ are present, where $\psi_Q$, $\psi_D$ are the inputs to the rectangular-to-polar converters in FIGS. 8, 9, 10 and where $L_m|\bar{i}_m'|$ is an output quantity in FIGS. 8, 9, 10. Thus, on the output of this circuit $i_y'$ will be present.

Figure 12:
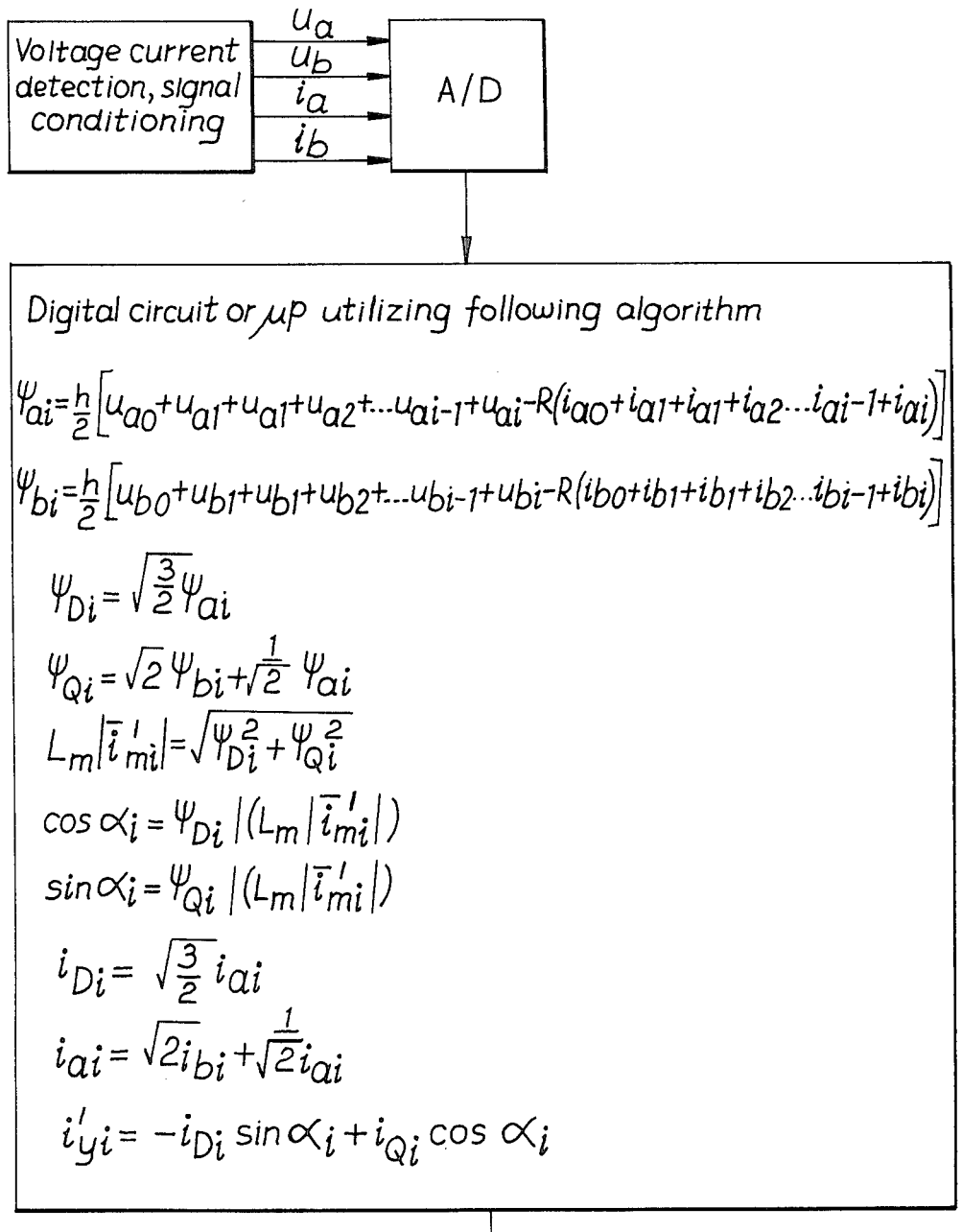
Figure 13:
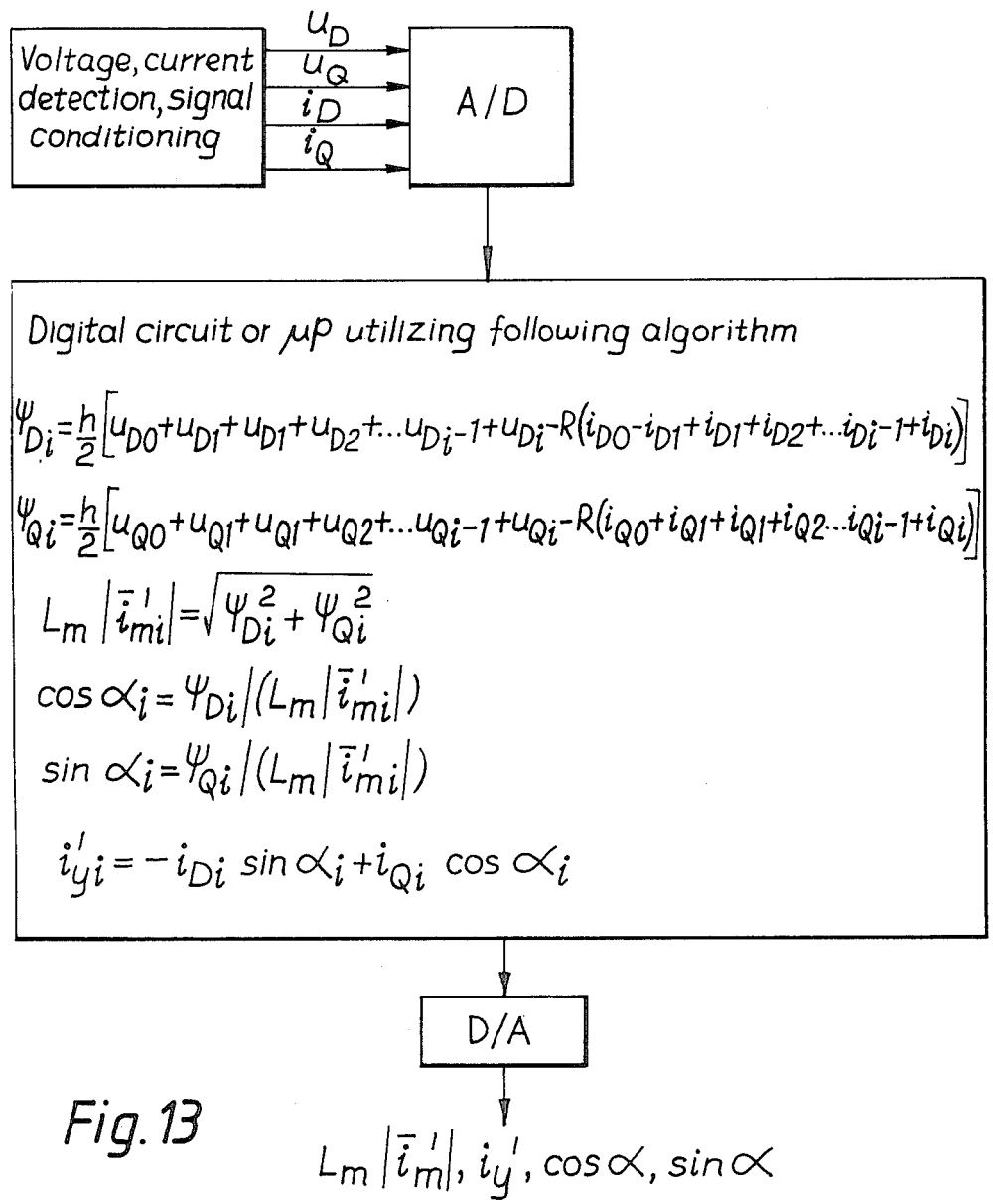

It is also possible to have fully digital implementations. For three-phase machines, these will be similar to those shown in FIGS. 30, 31 and 32, however, the algorithms using the techniques presented in this section are shorter. These implementations are shown in FIGS. 11, 12, 13.

1.3 $\overline{\psi}_m''$-oriented control

In sections 3.2 and 1.2 signals have been obtained which can be used for fast torque control of A.C. machines using a main-flux oriented reference frame and a modified magnetising-current oriented reference frame. All the signals have been obtained by utilising monitored supply voltages and currents. However, if it is the purpose to apply similar concepts for the quick torque control of a slip-ring induction machine, where the rotor currents can be monitored, it can be shown that in a special reference frame, where the real-axis of the reference frame is aligned with the magnetising-flux-space vector (expressed in the rotor reference frame), the electromagnetic torque can be expressed as $$t_e \propto -|\overline{\psi}_m''| i_y'' \qquad (7)$$

where $|\overline{\psi}_m''|$ is the modulus of the magnetising flux linkage space-vector formulated in the special reference frame and $i_y''$ is the quadrature-axis component of the rotor currents in the special reference frame.

In Eqn. (7) $i_y''$ can be expressed by the actual phase-variable rotor currents, or by their two-axis values as follows $$i_y'' = i_{rq} \cos(\mu_m - \theta) - i_{rd} \sin(\mu_m - \theta) \qquad (8)$$

where $\mu_m$ is the space angle of the magnetising flux linkage space vector with respect to the real-axis of the stationary reference frame and $\theta$ is the space angle between the stator phase "a" and the rotor phase "a". Eqn. (8) is similar to the equation of $i_y$ which can be obtained from Eqn (2), however, while in Eqn (2) the two axis components of the supply currents are present, in Eqn. (8) the two-axis components of the rotor currents are present, and in contrast to Eqn. (2) where $\mu_m$ is present, in Eqn. (8) the angle $(\mu_m - \theta)$ is present. This shift in the angle is due to the fact that datum phase "a" on the rotor is displaced by $\theta$ from datum phase "a" on the stator.

It would appear from Eqn (8), that it is also necessary to know the rotor angle too, for the $\overline{\psi}_m''$-oriented control. However, if the actual values of the rotor currents are monitored $-R_r \overline{i}_r - L_{rl}(d\overline{i}_r/dt)$ will give the rate of change of $\overline{\psi}_m''$, thus $$\frac{d\overline{\psi}_m''}{dt} = -R_r \overline{i}_r - L_{rl}\left(\frac{d\overline{i}_r}{dt}\right) \qquad (9)$$

In Eqn. (9) $R_r$ and $L_{rl}$ are the rotor resistance and leakage inductance and $\overline{i}_r$ is the space vector of the rotor currents in the reference frame fixed to the rotor. Since $\overline{\psi}_m'' = |\overline{\psi}_m''| \exp[j(\mu_m - \theta)]$, it follows from Eqn. (9) that it is not necessary to know the separate values of $\mu_m$, $\theta$, since Eqn. (7) requires $(\mu_m - \theta)$, which can be obtained from Eqn. (9).

It should be noted, that in Eqn. (9) it has been assumed that $L_{rl}$=constant; in other words, the effects of saturation of the rotor leakage flux paths have been neglected. However, if this effect is also taken into account, $\overline{\psi}_m''$ can be determined by considering $$\frac{d\overline{\psi}_m''}{dt} = -R_r \overline{i}_r - L_{rl} \frac{d\overline{i}_r}{dt} - \overline{i}_r \frac{dL_{rl}}{dt} \qquad (10)$$

where $L_{rl}$ is a function of the rotor currents. Eqn. (10) contains two derivatives, and $\overline{\psi}_m''$ can be obtained by the integration of the expression on the right-hand side. However, it is simpler to obtain $\overline{\psi}_m''$ where the derivatives of such quantities are not present which will be later integrated. Thus, it is simpler to utilise the following equation, which is also based on the physical facts that the total rotor flux linkage space vector is the sum of the leakage and magnetising flux linkage space vectors:

$$\frac{d\overline{\psi}_m''}{dt} = -R_r \overline{i}_r - \frac{d(L_{rl}\overline{i}_r)}{dt} \qquad (11)$$

It can be seen from the equations present in this section that to implement the $\overline{\psi}_m''$-oriented control, it is necessary to know two machine parameters ($R_r$, $L_{rl}$) and to monitor the rotor currents. This is simpler than the technique presented in Section 1.1, where it was necessary to know two machine parameters ($R_s$, $L_{sl}$), but it was also necessary to monitor the supply voltages and currents. In the case of the slip-ring induction motor, the rotor voltages do not have to be monitored because the rotor windings are short-circuited.

For completeness, the real axis component of the rotor currents in the special reference frame, expressed in terms of the two-axis rotor current components (formulated in the reference frame fixed to the rotor) is also given and is as follows $$i_x'' = i_{rd} \cos(\mu_m - \theta) + i_{rq} \sin(\mu_m - \theta) \qquad (12)$$

Thus Eqns. (8) and (12) give the required transformation between $i_x''$, $i_y''$ and $i_{rd}$, $i_{rq}$. For three-phase slip-ring machines, $i_{rd}$ and $i_{rq}$ are obtained from the monitored three-phase rotor currents by considering $$i_{rd} = C_1 i_{ra} \qquad (13)$$

$$i_{rq} = C_2 (r_{rb} - i_{rc}) \qquad (14)$$

where $C_1$ and $C_2$ are constants.

For slip-ring induction machines, techniques will now be presented which utilise the equations presented above, and where the rotor currents are monitored and $|\overline{\psi}_m''|$ and $(\mu_m - \theta)$ and $i_y''$ are obtained.

FIG. 14 shows a possible analogue implementation, which uses three monitored rotor currents ($i_{ra}$, $i_{rb}$, $i_{rc}$). In all three phases the ohmic voltages are integrated, and $R_r$ is the resistance of a rotor winding. From the negative value of the integrated ohmic voltages the corresponding leakage fluxes are subtracted, and $L_{rl}$ is the leakage inductance of a rotor winding. Both $L_{rl}$ and $R_1$ can be constants or variables, which can be obtained from preliminary tests or can be obtained by on-line signal processing.

Following the subtraction of these signals, the resulting quantities are corrected by required constants and are added or subtracted to give the real and imaginary-axes components of $\overline{\psi}_m''$. These two-axis components are fed into a rectangular-to-polar converter, or into another device, on whose outputs two quantities are obtained, which are proportional to $|\overline{\psi}_m''|$ and $\mu_m''$ and $\mu_m - \theta$.

A similar circuit is shown in FIG. 15, however, only two rotor currents $i_{ra}$, $i_{rb}$ have to be monitored. The ohmic voltage drops are integrated and from their negative values the corresponding leakage flux linkages are subtracted. The obtained two quantities are then corrected by appropriate constants and finally on the inputs of the rectangular-to-polar converter the two-axis components of $\overline{\psi}_m''$ appear. Thus, on the outputs of the rectangular-to-polar converter $|\overline{\psi}_m''|$ and $\mu_m - \theta$ are present.

If the two-axis components of the rotor currents $i_{rd}$, $i_{rq}$ are determined from the monitored phase-variable rotor currents in accordance with Eqns. (13) and (14), and if these currents are used as input quantities in the implementation shown in FIG. 16, similarly to FIGS. 14, 15, on the output terminals $|\overline{\psi}_m''|$ and $\mu_m - \theta$ will be present.

To obtain $i_y''$, which is present in the expression of the electromagnetic torque [see Eqn. (7)], Eqn. (8) has to be implemented. If a circuit similar to that shown in FIG. 6 is used, but on the input terminals $\cos(\mu_m - \theta)$, $i_{ra}$, $i_{rb}$ and $\sin(\mu_m - \theta)$ are present, on the output terminals $i_y''$ will appear.

Similarly, a circuit which is similar to that shown in FIG. 7 can be used, if on the input terminals of the circuit shown in FIG. 7 $i_{ra}$, $i_{rb}$ $\psi_{mq}$, $|\overline{\psi}_m''|$, $\psi_{md}$ are present, where $\psi_{mq}$, $\psi_{md}$ are the inputs to the rectangular-to-polar converters in FIGS. 14, 15, 16 and $|\overline{\psi}_m''|$ is an output quantity in FIGS. 14, 15, 16. Thus $i_y''$ will be present on the output of this circuit.

It is possible to have fully digital implementations. Some possible forms of implementation are shown in FIGS. 17, 18, 19.

1.4 $\psi_m''$-oriented control

If it is the purpose to achieve a fast torque control of a slip-ring induction motor where the rotor currents are monitored, it is very useful to implement such a vector-control scheme, which is an $\overline{i}_m''$-oriented control, where $\overline{i}_m''$ is related to the magnetising-flux-linkage space vector $(\overline{\psi}_m'')$ introduced to Section 1.3 by $$\overline{i}_m'' = (\overline{\psi}_m'' + L_{rl}\overline{i}_r)/L_m \qquad (15)$$

where $L_{rl}$ and $L_m$ are the rotor leakage inductance, and magnetising inductance respectively, and $\overline{i}_r$ is the space vector of the rotor currents in a reference frame fixed to the rotor.

By utilising Eqns. (7) and (8) it can be shown that if such a special reference frame is used, which is aligned with $\overline{i}_m''$, the electromagnetic torque can be expressed as $$t_e \propto L_m |\overline{i}_m''| i_y''' \qquad (16)$$

where $|\overline{i}_m|$ is the modulus of the special magnetising-current space vector and $i_y'''$ is the quadrature-axis component of the rotor currents in the special reference frame. Thus $i_y'''$ can be obtained from the two-axis components of the actual rotor currents ($i_{rd}$, $i_{rq}$) by considering $$i_y''' = i_{rq} \cos\alpha' - i_{rd} \sin\alpha' \qquad (17)$$

where $\alpha'$ is the space angle of the magnetising-current space vector $\overline{i}_m''$ with respect to the real-axis of the rotor d-axis.

It is a great advantage of the $\overline{i}_m''$-oriented reference frame that $L_m|\overline{i}_m''|$ and $i_y'''$ can be obtained by monitoring the actual rotor currents and by knowing only one rotor parameter, which is the rotor resistance ($R_r$).

In case of a three-phase slip-ring machine, techniques will now be presented where only the rotor currents are monitored and $|\overline{i}_m''|$ and $\alpha'$ are obtained.

FIG. 20 shows a possible analogue implementation which uses the actual rotor currents ($i_{ra}$, $i_{rb}$, $i_{rc}$). In all three rotor phases the ohmic voltage drops are integrated. The quantities obtained are added or subtracted and corrected by appropriate constants. On the inputs of the rectangular-to-polar converter the real and imaginary-axes components of $L_m\overline{i}_m''$ are present and on its outputs $L_m|\overline{i}_m''|$ and $\alpha'$ are present. The rotor resistance ($R_r$) can be constant or variable and can be obtained by on-line signal processing or can be assumed to be known from standard tests. It is important to note that only one rotor parameter has to be known.

A similar, but simpler circuit, using only two integrators is shown in FIG. 21, where only two rotor currents ($i_{ra}$, $i_{rb}$) are monitored.

If the two-axis components of the monitored rotor currents ($i_{rd}$, $i_{rq}$) are inputs to a system where $L_m|\overline{i}_m''|$ and $\alpha'$ are to be obtained, FIG. 22 shows one possible implementation, which is very simple.

The transformed current $i_y'''$ can be obtained by utilising Eqn. (17). If a circuit similar to that shown in FIG. 6 is used, but on the input terminals $\cos\alpha'$, $i_{ra}$, $i_{rb}$, $\sin\alpha'$ are present, $i_y'''$ will appear on the output. Similarly, a circuit which is similar to that shown in FIG. 7 can be used to obtain $i_y'''$, if on the input terminals of the circuit shown in FIG. 7 $i_{ra}$, $i_{rb}$, $L_m i_{md}$, $L_m|\overline{i}_m''|$, $L_m i_{mq}'$ are present, where $L_m i_{md}$, $L_m i_{mq}$ are the inputs to the rectangular-to-polar converters in FIGS. 20, 21, 22, and $L_m|\overline{i}_m''|$ is an output quantity in FIGS. 20, 21, 22. Thus, on the output of this circuit $i_y'''$ will be present.

Figure 23:
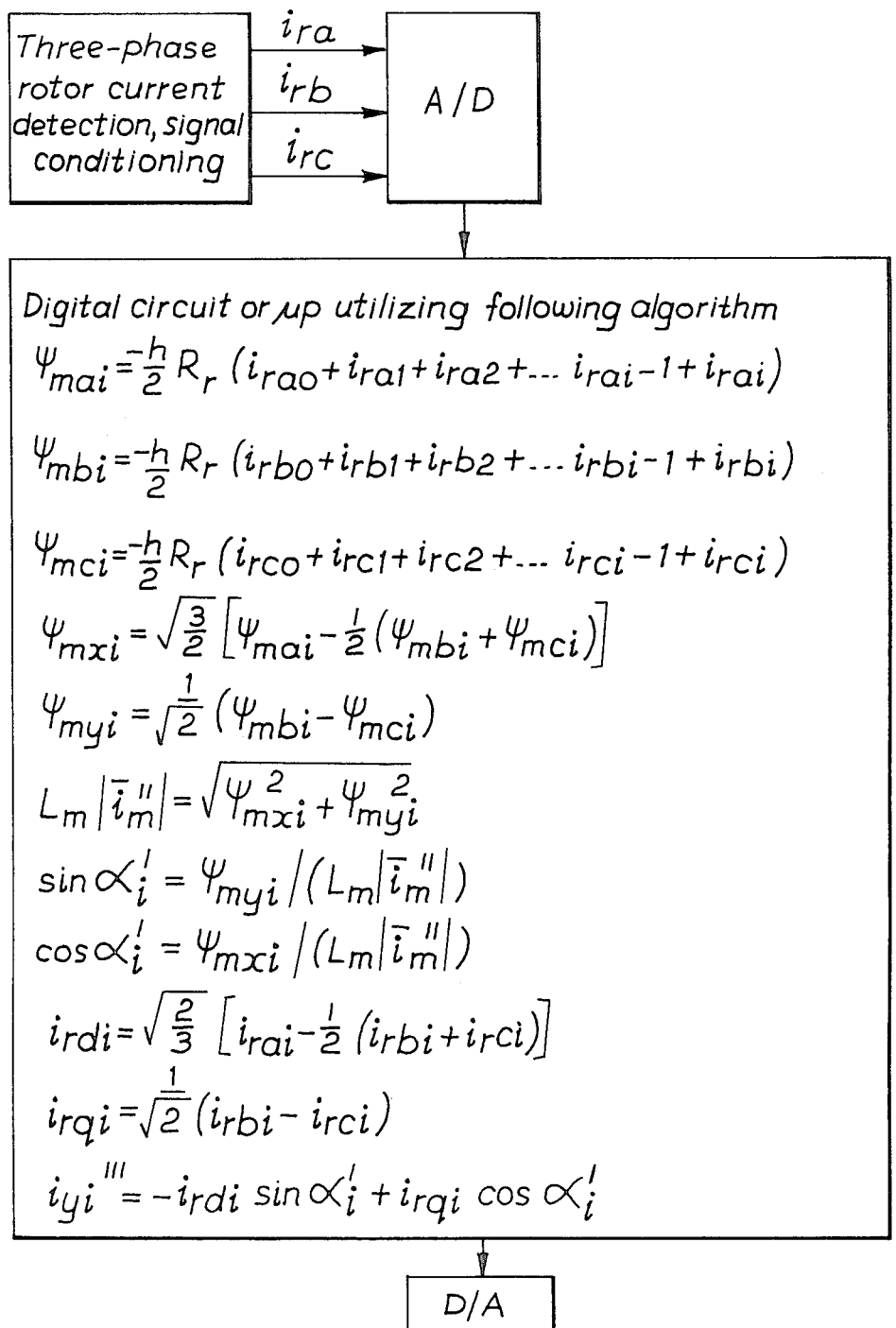
FIGS. 23, 24 and 25 show possible digital implementations of $\bar{i}_m''$ oriented control of a machine.
Figure 24:
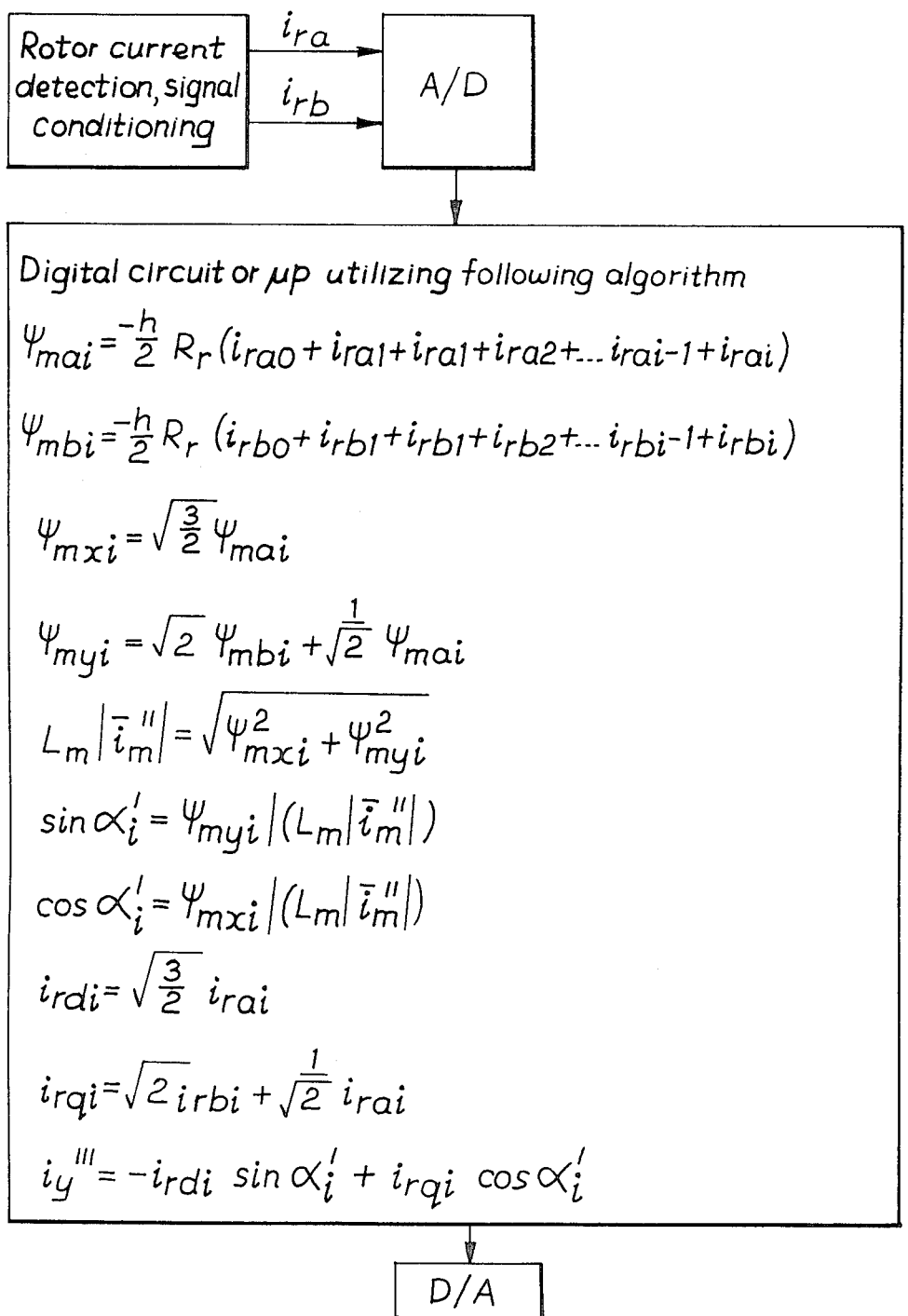
Figure 25:
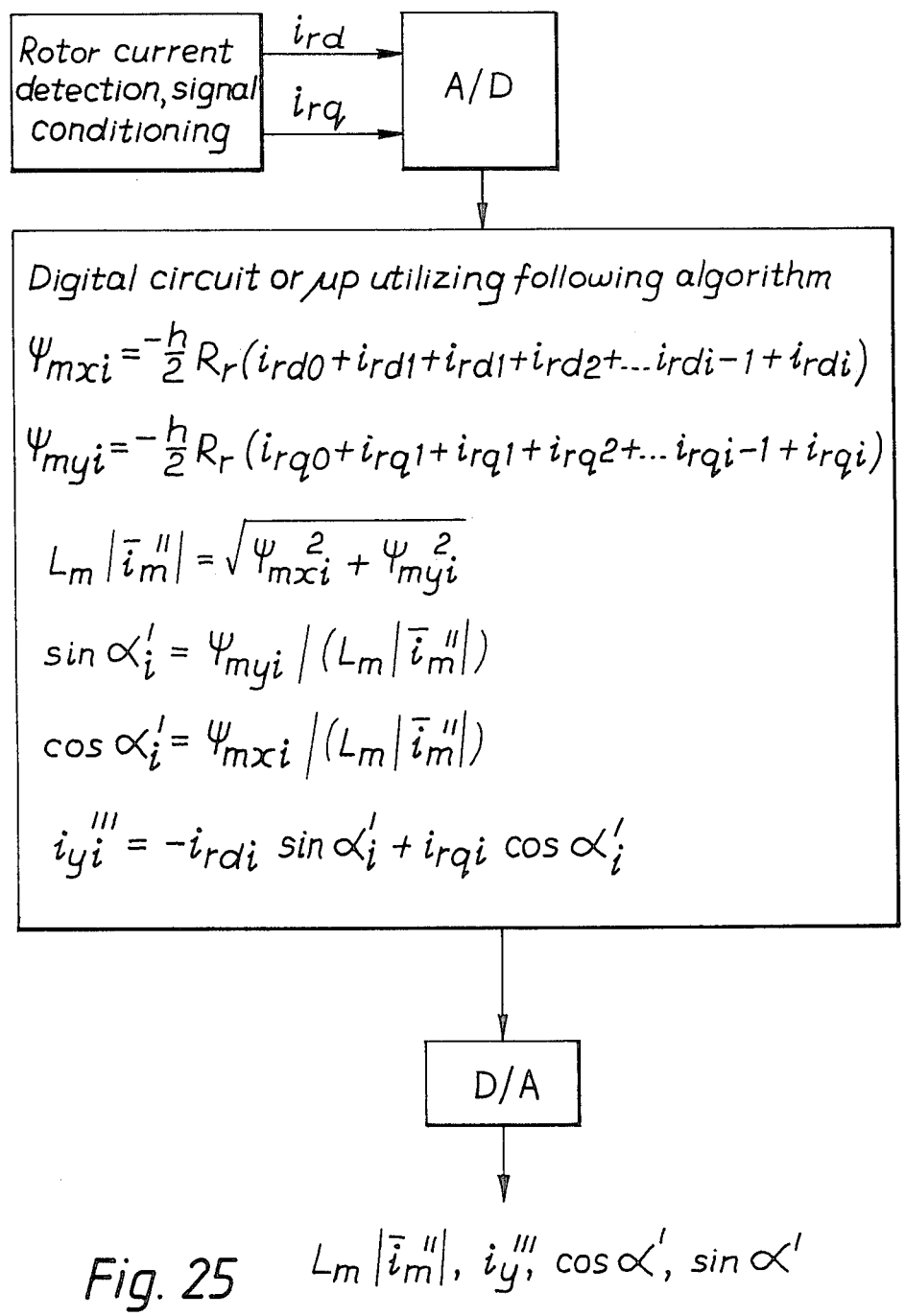

It is possible to have fully digital implementations, as are shown in FIGS. 23, 24, 25. These require less computations than in the case of the algorithms presented in FIGS. 17, 18, 19.

2. Circuits which can be used with M-phase a.c. machines and which require integration 2.1 $\overline{\psi}_m$-oriented control The phase voltages and currents of an M-phase machine can also be monitored even if the neutral point is unavailable. FIG. 26 shows the application of voltage divider networks where $u_a$, $u_b$, ... $u_M$ are obtained across the terminals of resistors r. These voltages are then fed into isolation amplifiers 200 etc. which have high input impedances. Phase currents $i_a$, $i_b$, $i_c$ ... $i_M$ are monitored by current shunts 202, 204 ... 206 and the voltages across the shunts are fed into isolation amplifiers 208, 210, ... 212.

If the M-phase side of the machine is supplied by M-phase voltages, in the absence of space harmonics the space vector of the supply voltages is $$\overline{u} = C_M(u_a + \epsilon u_b + \epsilon^2 u_c + \ldots \epsilon^{M-1} u_M) \qquad (18)$$

where $u_a$, $u_b$, ... $u_M$ are the instantaneous phase voltages, $\epsilon = e^{j2\pi/M}$ and $C_M$ is a constant. Similarly, the space-vector of supply currents is $$\overline{i} = C_M(i_a + \epsilon i_b + \epsilon^2 i_c + \ldots \epsilon^{M-1} i_M) \qquad (19)$$

where $i_a$, $i_b$ ... $i_M$ are the instantaneous values of the phase currents.

FIG. 27 shows a circuit, where $|\overline{\psi}_m|$, $\mu_m$ are obtained if M>3. The ohmic voltage drops are subtracted from the terminal voltages in circuits 220, 222, 224, . . . 226, and the voltages obtained are integrated in circuits 230, 232, 234 . . . 236 to give the flux linkages of each of the phases. The leakage flux linkages are subtracted from these in circuits 240, 242, 244 . . . 246, and the phase components of the magnetising flux linkages 8$\psi_{ma}$, $\psi_{mb}$, . . . $\psi_{mM}$) are obtained. These are then multiplied in the constant multiplying circuits 250 . . . 260 shown in FIG. 27 and $\psi_{mD} = \psi_{ma} + \cos\left(\dfrac{2\pi}{M}\right)\psi_{mb} +$ $\cos\left[\left(\dfrac{M-1}{M}\right)\pi\right]\psi_{mM}$ and $\psi_{mQ} = \psi_{mb}\sin\left(\dfrac{2\pi}{M}\right) +$ $\psi_{mc}\sin\left(\dfrac{4\pi}{M}\right) + \ldots \psi_{mM}\sin\left[\dfrac{(M-1)}{M}\pi\right]$ The two-axis components of the magnetising flux linkage space vector are obtained in adders 270, 272. A rectangular-to-polar converter 274 converts these into $|\overline{\psi}_m|$ and $\mu_m$.

In FIG. 28 there is shown an alternative system to FIG. 27, where the number of integrators is reduced, thus leading to greater accuracy. The phase voltages are multiplied in circuits 300, 302 . . . 314 by the appropriate constants shown in FIG. 28 and are added in adders 320, 322, 324, 326 to give $u_D$ and $u_Q$, respectively. The phase currents are converted similarly to give $i_d$, $i_q$. The two axis voltages obtained are then reduced in subtraction circuits 328, 330 by the ohmic voltage drops and the voltage thus obtained is integrated in integrators 332, 334 to give total D and Q axis fluxes. These are then reduced in subtraction circuits 336, 338 by the leakage flux linkages, and the two-axis components of the magnetising flux linkage space vector obtained are fed into rectangular-to-polar converter 340. On the outputs of the rectangular-to-polar converter $|\psi_m|$ and $\mu_m$ appear.

FIG. 29 shows a circuit which can be used for obtaining $i_y$. The input values are the voltages proportional to $i_D$, $i_Q$, $\psi_{mQ}$, $\psi_{mD}$, $|\overline{\psi}_m|$ which are obtained from the circuit of FIG. 28. $\psi_{mQ}$ and $|\psi_m|$ are fed into a divider 350 to give sin $\mu_m$. $\psi_{mD}$ and $|\overline{\psi}_m|$ are fed into another divider 352 to give cos $\mu_m$. Finally, sin $\mu_m$ and $i_D$ are fed into a multiplier 354 and cos $\mu_m$ and $i_Q$ are fed into another multiplier 356. The differences of the two multiplier outputs obtained in a subtraction circuit 358 give $i_y$.

It must be noted that it is possible to substitute some parts of the circuits shown in FIGS. 3, 4, 5, 6, 26, 27, 28, 29 by digital circuits if the input signal to these are converted to digital signals and if their output signals are converted to analogue signals.

Digital circuits will now be described for obtaining $|\overline{\psi}_m|$, $\mu_m$ and $i_y$ which use the monitored voltages and currents of the machine to obtain these quantities.

In the case of three-phase machines, if $u_a$, $u_b$, $u_c$ and $i_a$, $i_b$, $i_c$ are detected, it is possible to obtain $|\overline{\psi}_m|$, $i_y$ and cos $u_m$, sin $u_m$ by using the digital technique described in FIG. 30. The voltages and currents are detected as shown in rectangle 400 by using the techniques described with reference to FIGS. 2 to 11. The analogue signals are then converted into digital signals in a converter 402. The digital values of the voltages and currents at a $t_i$ instant of time are $u_{ai}$, $u_{bi}$, $u_{ci}$ and $i_{ai}$, $i_{bi}$, $i_{ci}$ respectively, where i=0, 1, 2, . . . The samples are taken at $t_o$, $t_o+h$ and $t_o+2h$ instants. In FIG. 30 that are shown the equations which consist of the sampled values and also consist of terms incorporating R and L. These can be programmed in a microprocessor or can be used to construct the necessary digital circuits.

First, the phase components of the magnetising flux linkage space vector are established, these are $\psi_{mai}$, $\psi_{mbi}$, $\psi_{mci}$. For simplicity, it has been assumed that the integration constants are zero. However, if they are non zero, they could be easily incorporated in the algorithm. These are used to obtain the stationary two-axis flux linkage components $\psi_{mDi}$ and $\psi_{mQi}$, which determine $|\overline{\psi}_{mi}|$, which is the modulus of the magnetising-flux-linkage space vector at the instant $t_i$. If the position of the magnetising flux-linkage space vector is determined by $\mu_{mi}$ cos $\mu_{mi}$ and sin $\mu_{mi}$ can be determined by the given algorithm. Finally, the discrete values of the phase currents are used to give $i_{Di}$ and $i_{Qi}$, which are the two-axis currents in the stationary reference frame at instant $t_i$. The current $i_{yi}$ is determined by the last equation in FIG. 30, and the digital signals are then converted to analogue signals by the D to A converter 404.

It must be noted that if the signal conditioning circuit were to incorporate operational amplifiers, D.C. offset voltages would be produced. However, these could be removed by well-known techniques or they could be subtracted from the terms shown on the right-hand side of $\psi_{mai}$, $\psi_{mbi}$, $\psi_{mci}$ in FIG. 30.

If in a three-phase machine, the zero-sequence voltages and zero-sequence currents are zero, it is possible to obtain $|\overline{\psi}_m|$, $\mu_m$ and $i_y$ by using $u_a$, $u_b$ and $i_a$, $i_b$, which are detected by using the methods described above. These analogue signals are shown in FIG. 31 and are converted into digital signals. The digital values at a $t_i$ instant of time are $u_{ai}$, $u_{bi}$, $i_{ai}$, $i_{bi}$ obtained by rectangular box 410 and converted by A to D converter 412. These digital samples, together with constants R and L are used to obtain $|\overline{\psi}_{im}|$ and $i_y$ at every time step by using the technique described in FIG. 31. The equations can be organised in a microprocessor or can be used to construct the necessary digital circuits.

First the a-phase and b-phase magnetising flux linkage components $\psi_{mai}$, and $\psi_{mbi}$ are established. In these equations h is the time step. These are used to obtain $\psi_{mDi}$ and $\psi_{mQi}$ which determine $|\overline{\psi}_{mi}|$. Similar considerations hold for the integration constants as for the algorithm presented in FIG. 30. The position of the magnetising current space vector is determined by $\mu_{mi}$ and cos $\mu_{mi}$ and sin $\mu_{mi}$ are obtained by using $|\psi_{mi}|$ and $\psi_{mDi}$ and $\psi_{mQi}$. The two-axis currents $i_{sDi}$ and $i_{sQi}$ are obtained from $i_{Qi}$ and $i_{Di}$, and $i_y$ is determined by $i_{Di}$, $i_{Qi}$, cos $\mu_{mi}$ and sin $\mu_{mi}$ in accordance with the last equation in FIG. 31. Finally, the digital signals are converted to analoque signals. This process is represented by the block D/A 414 in FIG. 31.

For a three-phase machine where the zero-sequence components are absent, it is possible to obtain the two-axis voltages $u_D$, $u_Q$ and currents $i_D$, $i_Q$ in a stationary reference frame by the methods described above. For a two-phase machine $u_D$, $u_Q$, $i_D$, $i_Q$ are non-transformed, actual values, which can be directly monitored. FIG. 32 shows the arrangement of a circuit, which is used to obtain $|\bar{\psi}_m|$, $i_y$ if the two-axis voltage and current components are known. The four analogue signals obtained by block 420 in a manner as previously described are converted to digital signals in the A to D converter block 422. The sampled values are $u_{Di}$, $u_{Qi}$, $i_{Di}$, $i_{Qi}$ at $t_i$ instant of time (i=0, 1, 2 ...). Firstly $\psi_{MDi}$ and $\psi_{mQi}$ are obtained by using the first two equations. These are then used to obtain $|\psi_{mi}|$. Finally $\cos \mu_{mi}$, $\sin \mu_{mi}$ are obtained, which together with $i_{Di}$, $i_{Qi}$ determine $i_{yi}$. The digital signals are then converted to analogue signals in block 424 and $|\psi_m|$, $i_y$, $\cos \mu_m$ and $\sin \mu_m$ are obtained. It must be emphasised that for three-phase machines the technique described in FIG. 32 gives simpler solutions than those presented in FIGS. 30 and 31.

For M phase machines the $u_a$, $u_b \ldots u_M$ instantaneous voltages and $i_a$, $i_b \ldots i_M$ instantaneous currents are monitored and these can be used to obtain $|\bar{\psi}_m|$, $i_y$ and $\cos \mu_m$ and $\sin \mu_m$. FIG. 33 shows a possible arrangement of the circuit. The monitored and signal-conditioned analogue voltages (which are proportional to $u_a \ldots u_m$, $i_a \ldots i_m$) are obtained as above described in block 430 and are converted into digital signals by the block 432 (A to D converter). The sampled digital values are then used to program a microprocessor or to serve as inputs to a dedicated digital circuit, using the algorithm given in FIG. 33. The digital samples are taken at $t_o$, $t_1=t_o+h$, ... $t_i$ instants of time. The digital samples of the signals which are proportional to the voltages and currents are $u_{ai}$, $u_{bi} \ldots u_{Mi}$, $i_{ai}$, $i_{bi} \ldots i_{Mi}$. These are used to obtain the a, b, ... M-phase magnetising flux leakage components $\psi_{mai}$, $\psi_{mbi}$, ... $\psi_{mMi}$. Similar considerations hold for the integration constants as before. The two-axis components of the magnetising flux linkage space vector are $\psi_{mDi}$, $\psi_{mQi}$ and these are obtained by using the phase-variable magnetising flux linkage components. The modulus $|\bar{\psi}_{mi}|$ is then obtained and $\cos \mu_{mi}$ and $\sin \mu_{mi}$ are determined by the modulus and by the two-axis components. The detected values of the currents are used to obtain $i_{Di}$, $i_{Qi}$, and finally $i_{yi}$ is obtained from the last equation. The digital values of $|\psi_{mi}|$; $i_{yi}$, $\cos \mu_{mi}$ and $\sin \mu_{mi}$ are converted into their analogue values by the block 434 represented by D/A.

Figure 34:
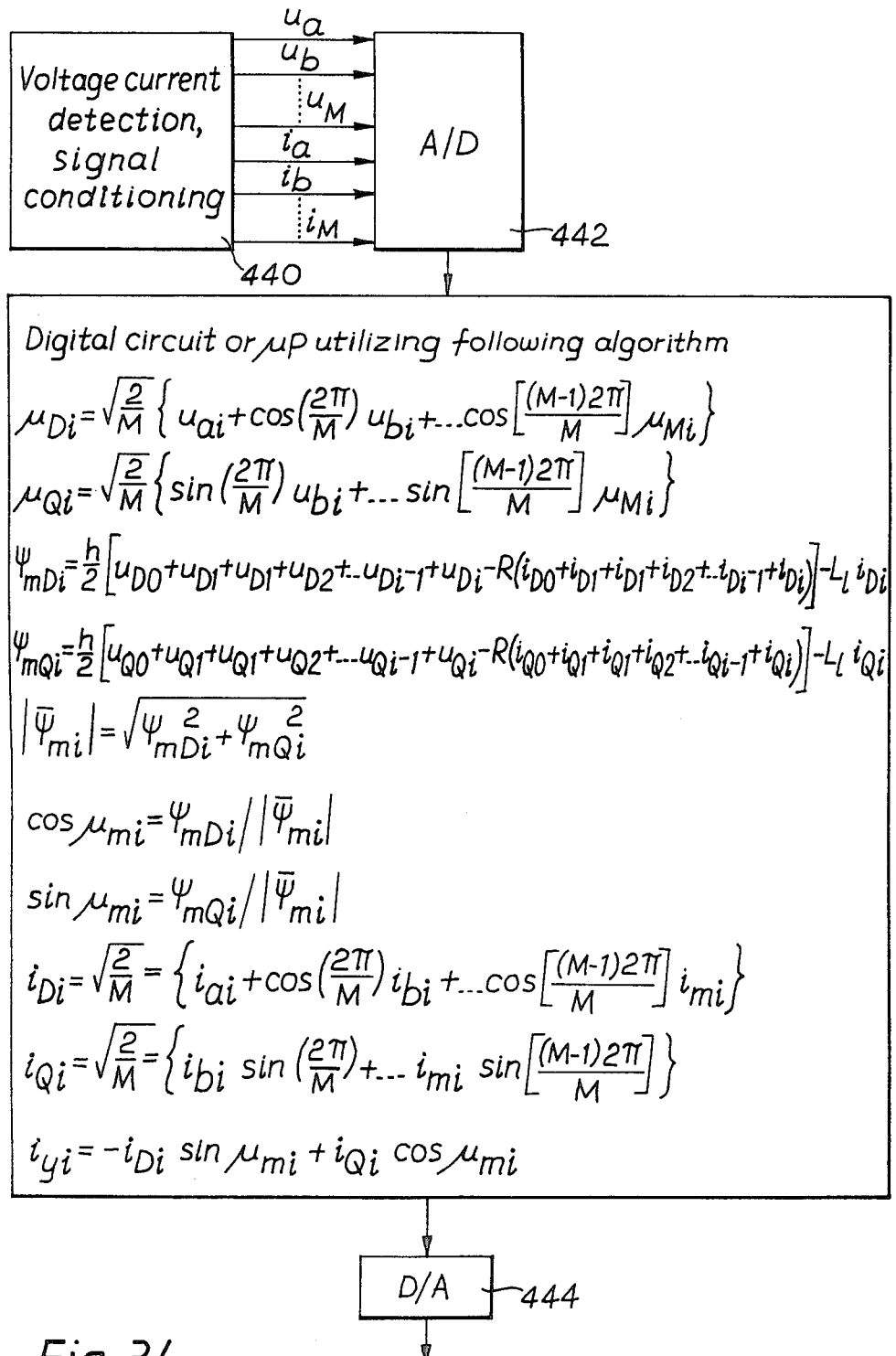
FIG. 34 shows schematically the system of FIG. 15 in a modified simpler form.

A simpler technique is obtained if the two-axis magnetising-flux-linkage components are not derived from the phase-variable magnetising-flux-linkage components, but are obtained directly from the two-axis components of the voltages and currents. FIG. 34 shows the resulting simpler circuit for this case. First, the analogue signals obtained in known manner as above described in block 440 are converted to digital signals by the block 442 represented by D/A. Sampled values are obtained, which are proportional to the M-phase voltages and phase currents. The samples are formed at $t_o$, $t_o+h$, - - - $t_i$ instants of time and at the general $t_i$ instant of time they are $u_{ai}$, $u_{bi}$, ... $u_{Mi}$; $i_{ai}$, $i_{bi}$ ... $i_{Mi}$. First the two-axis voltage components $u_{Di}$, $u_{Qi}$ are obtained. These are then used to obtain the two-axis components of the magnetising flux linkage space vector. Similar considerations hold for the integration constants as before. The two-axis components $\psi_{mDi}$, $\psi_{mQi}$, determine the modulus $|\bar{\psi}_{mi}|$ of the space vector. By using $\psi_{mdi}$, $\psi_{mqi}$ and $|\bar{\psi}_{mi}|$, $\cos \mu_{mi}$ and $\sin \mu_{mi}$ can be obtained. Finally, $i_{yi}$ is formulated by using $\cos \mu_{mi}$ and $\sin \mu_{mi}$ and also the two-axis current components $i_{Di}$, $i_{Qi}$. The digital values $|\bar{\psi}_{mi}|$, $i_{yi}$, $\cos \mu_{mi}$, $\sin \mu_{mi}$ are then converted into their analogue forms by the D/A convertor 444 shown in the last block of FIG. 34 and hence $|\bar{\psi}_m|$, $i_y$, $\cos \mu_m$ and $\sin \mu_m$ are obtained.

It must be noted that if there is a possibility of performing very high speed digital integration, more accurate values of $\psi_{mai}$, $\psi_{mbi}$, $\psi_{mci}$, $\psi_{mDi}$, $\psi_{mQi}$, can be obtained by using the following algorithm. The algorithm for $\psi_{mai}$, $\psi_{mbi}$, $\psi_{mci}$ in FIGS. 30, 31 should be replaced by:

$$\psi_{mai} = h[u_{ao} + 4u_{a1} + u_{a2} + \ldots u_{ai-2} + 4u_{ai-1} + u_{ai} -$$

$$R(i_{ao} + 4i_{a1} + i_{a2} + \ldots i_{ai-2} + 4i_{ai-1} + i_{ai})]/3$$

$$\psi_{mbi} = h[u_{bo} + 4u_{b1} + u_{b2} + \ldots u_{bi-2} + 4u_{bi-2} + u_{bi} -$$

$$R(i_{bo} + 4i_{b1} + i_{b2} + \ldots i_{bi-2} + 4i_{bi-1} + i_{bi})]/3$$

$$\psi_{mci} = h[u_{co} + 4u_{c1} + u_{c2} + \ldots u_{ci-2} + 4u_{ci-2} + u_{ci} -$$

$$R(i_{co} + 4i_{c1} + i_{c2} + \ldots i_{ci-2} + 4i_{c-1} + i_{ci})]/3$$

The algorithm for $\psi_{mDi}\psi_{mQi}$ in FIGS. 32, 34 should be:

$$\psi_{mDi} = h[u_{Do} + 4u_{D1} + u_{D2} + \ldots u_{Di-2} + 4u_{Di-1} + u_{Di} -$$

$$R(i_{Do} + 4i_{D1} + i_{D2} + \ldots i_{Di-2} + 4i_{Di-1} + i_{Di})]/3$$

$$\psi_{mQi} = h[u_{Qo} + 4u_{Q1} + u_{Q2} + \ldots u_{Qi-2} + 4u_{Qi-1} + u_{Qi} -$$

$$R(i_{Qo} + 4i_{Q1} + i_{Q2} + \ldots i_{Qi-2} + 4i_{Qi-1} + i_{Qi})]/3$$

It is an important feature of all the algorithms described above is that they can be used to establish hybrid circuits which combine digital and analogue circuits thereby enabling the desired values to be calculated more rapidly.

2.2 $\bar{i}_m'$-oriented control

The concepts utilised in Section 1.2 can be extended to M-phase machines.

One possible implementation can be similar to the one shown in FIG. 10, but on the input the two-axis components of the M-phase supply voltages and currents have to be present, and on the output terminals $L_m|\bar{i}_m'|$ and $\alpha$ quantities are present, where $L_m$ is the magnetising inductance of the M-phase machine, $|\bar{i}_m'|$ is the modulus of the M-phase space-vector of the special modified magnetising-current and $\alpha$ is the space angle of the same space vector.

3. Obtaining signals necessary for vector-control by using integrator-free implementations 3.1 $|\bar{\psi}_m|$ =constant If the modulus of the magnetising flux linkage space vector is constant, $|\bar{\psi}_m|$ =const., it follows from Eqn. (3) that the electromagnetic torque is proportional to the quadrature-axis component of the supply currents ($i_y$) formulated in the special reference frame fixed to the magnetising flux linkage space vector. Therefore, for the purposes of field-oriented control $i_y$ and the angle of the "magnetising" flux-linkage space vector ($\mu_m$) have to be obtained.

If the terminal voltages and currents of the machine are monitored, it is possible to obtain $i_y$ and $\mu_m$ by using analogue, digital or hybrid techniques, where it is not necessary to perform integration. Since $|\bar{\psi}_m|$ =const., the modulus of the space vector of the magnetising voltage ($\bar{u}_m$) has to be proportional to $|\bar{\psi}_m|$ and also to the speed of the magnetising flux linkage space vector, relative to a stationary reference frame. The space vector of the magnetising voltages leads the space vector of the magnetising flux linkages by ninety degrees. As a consequence, the space angle of the magnetising flux linkage space vector can be expressed in terms of the direct or quadrature-axis components of the magnetising voltage space vector, formulated in the stationary reference frame. Thus by considering Eqn. (2), the following expression holds for $i_y$:

$$i_y = (u_{MD} i_d + u_{MQ} i_Q) / |\bar{u}_m| \quad (20)$$

where $u_{MD}$, $u_{MQ}$ are the real and imaginary axes components of the magnetising voltage space vector in the stationary reference frame and $|\bar{u}_m|$ is the modulus of the magnetising voltage space vector. In Eqn. (20) $i_D$ and $i_Q$ are the two-axis components of the stator currents in the stationary reference frame.

Since Eqn. (20) contains quantities formulated in the stationary reference frame, all quantities can be obtained directly by monitoring the terminal voltages and currents of the machine. Thus in Eqn. (20), the magnetising voltage components can be obtained from the monitored two-axis components of the terminal voltages ($u_D$, $u_Q$) and currents ($i_D$, $i_Q$) by utilising the following equations:

$$u_{md} = u_D - R i_D - L_l \frac{d i_D}{dt} - i_D \frac{d L_l}{dt} \quad (21)$$

$$u_{mQ} = u_Q - R i_a - L_l \frac{d i_Q}{dt} - i_Q \frac{d L_l}{dt} \quad (22)$$

In Eqns. (21) and (22) R and $L_l$ are the resistance and leakage inductance of a phase winding on the supply side of the machine.

Eqns. (21) and (22) incorporate the effects of main flux and leakage flux saturation and $L_l$ is in general current dependent. Under linear magnetic conditions the last term on the right-hand side of Eqns. (21) and (22) is zero. It is important to observe that Eqns. (20) and (21) do not require the magnetising inductance, which would be a variable parameter and a function of the modulus of the magnetising current space vector. Eqns. (21) and (22) hold for semi-four-phase and three-phase machines and are also valid for multi-phase machines with phase numbers higher than three, if the effects of space harmonics can be ignored.

The two-axis components of the terminal voltages and currents can be obtained by considering the techniques described in the previous sections. Alternatively, the two-axis voltages and currents can be substituted by expressions containing the terminal voltages and currents and the thus obtained equations—which contain only phase variable quantities—could be directly used for implementation.

One possible form of analogue implementation of Eqns. (20), (21), (22) is shown in FIG. 35, but it should be noted that these equations can be directly used for digital or hybrid implementation. In FIG. 35 the inputs are the monitored $u_D$, $u_Q$, $i_D$, $i_Q$ quantities and on the outputs $i_y$ and $\mu_m$ are present. In FIG. 35 the block containing "p" represents a differentiator. The term $L_l p i_D + i_D p L_l$ could also be obtained by considering $p(i_D L_l)$, and similarly the term $L_l p i_Q + i_Q p L_l$ could be obtained by considering $p(i_Q L_l)$. Thus, in FIG. 35, the blocks within the broken lines could be replaced by blocks where differentiation is performed on the $i_D L_l$ and $i_Q L_l$ products.

It should be also noted that by utilising $i_D$, $i_Q$ and $\mu_m$ it is also possible to obtain $i_y$ by implementing the circuit shown in FIG. 36. This implementation contains amplifiers which perform trigonometric conversions to obtain $\sin \mu_m$ and $\cos \mu_m$.

In general, if only two terminal voltages and two terminal currents of a semi-four-phase or three-phase machine are monitored, $\mu_m$ and $i_y$ can be obtained by considering the scheme shown in FIG. 37. In FIG. 37 $u_{MD}$, $u_{MQ}$ are obtained from the terminal voltages and currents by using Eqns. (21) and (22). Alternatively the "b" and "c" phase magnetising voltages can be obtained from $u_b$, $u_c$, $i_b$, $i_c$, by considering Eqns. (21), (22) and also the relationship between the three-phase and quadrature-phase stationary-axis components. Thus $u_{MD}$, $m_{MQ}$ can be used to obtain $|\bar{u}_m| = \sqrt{u_{md}^2 + U_{mQ}^1}$, or alternatively, $u_{mb}$, $u_{mc}$ can be used to obtain $|u_m|$. The phase angle $\mu_m$ can be obtained from $\mu_m = \cos^{-1}(u_{MD}/|\bar{u}_m|)$ or from $\mu_M = \sin^{-1}(u_{MQ}/|u_m|)$ or directly from $u_{mb}$, $u_{mc}$. The torque producing current $i_y$ can be obtained by using Eqn. (2) or Eqn. (6), or such forms of Eqn. (6) where $u_{MD}$, $u_{MQ}$ and $|\bar{u}_m|$ are directly expressed in terms of the phase-variables. It should be noted, that in Eqn. (6) $i_D$ and $i_Q$ can be expressed by $i_b$ and $i_c$.

It is a main advantage of the implementations discussed in the present section that they do not require integration. There are only two machine parameters which must be known, however, these could be obtained either by standard tests, or they could be directly obtained from monitored currents and voltages. In the latter case they represent true values at any instant of time.

3.2 $L_m |i_m'| = $ constant

In Section 1.2 the implementations of $\bar{L}_m'$-oriented control have been presented. If $L_m |\bar{L}_m'|$ is constant, it follows from Section 1.2 that the electromagnetic torque is proportional to the quadrature-axis component of the supply currents ($i_y'$) formulated in a special reference frame fixed to the modified magnetising current space vector $i_m 40$. Therefore, for the purposes of $\bar{L}_m$-oriented control, $i_y'$ and the angle of the modified magnetising current space vector ($\alpha$) have to be obtained.

If the supply voltages and currents of the machine are monitored, it is possible to obtain $i_y'$ and $\alpha$ by using angalogue, digital or hybrid techniques, where it is not necessary to perform integration. Since $L_m |\bar{L}_m'| = $const., the modulus of the space vector of the modified magnetising voltage ($\bar{u}_m'$) has to be proportional to $L_m |\bar{i}_m'|$ and also to the speed of the modified magnetising current space vector in the stationary reference frame. The space vector of the modified magnetising voltages leads the space vector of the modified magnetising currents by ninety degrees. Thus, the space angle of the modified magnetising current space vector can be expressed in terms of the real or imaginary-axis components of the modified magnetising voltage space vector, formulated in the stationary reference frame. Therefore, by considering Eqn. (5), the following expression holds for $i_y'$ $$i_y' = (u_D' i_D + u_Q' i_Q) / |\bar{u}_m'| \quad (23)$$

where $u_D'$, $u_Q'$ are the real and imaginary axes components of the modified magnetising voltage space vector in the stationary reference frame and $|\bar{u}_m'|$ is the modulus of the same magnetising voltage space vector. In Eqn. (23), $i_D$ and $i_Q$ are the two-axis components of the stator currents in the stationary reference frame.

Since Eqn. (23) contains quantities formulated in the stationary reference frame, all of these can be obtained directly by monitoring the terminal voltage and currents of the machine. The two-axis components of the terminal voltages and currents can be obtained by considering the techniques described in the previous sections. Alternatively, the two-axis components can be substituted by expressions which contain the phase-variable voltages and currents.

One possible form of analogue implementation is shown in FIG. 38. In FIG. 38 the inputs are the $u_D$, $u_Q$, $i_D$, $i_Q$ quantities, which for a two-phase machine are directly monitored, or for a three-phase machine are obtained from the monitored values of phase-variable quantities.

In general, if only two phase-variable terminal voltages and two phase-variable currents of a semi-four-phase or three-phase machine are monitored, $i_y'$ and $\alpha$ can be obtained by using the circuit shown in FIG. 39, which can be implemented by using analogue, digital or hybrid techniques. The two-axis components $u_D'$, $u_Q'$ are obtained. In FIG. 39 by utilising $$u_D' = u_D - Ri_D$$
$$U_Q' = U_Q - Ri_Q \quad (24)$$

or $u_b'$, $u_c'$ are obtained by $$u_b' = u_b - Ri_b$$
$$u_c' = u_c - Ri_c \quad (25)$$

In the second block of FIG. 39, $|\bar{u}_m'|$ and $\alpha$ are obtained by considering $$|\bar{u}_m'| = \sqrt{u_D'^2 + u_Q'^2}$$
$$\alpha = \tan^{-1}(u_Q'/u_D') \quad (26)$$

In the third block of FIG. 39, $i_y'$ is obtained by considering Eqn. (23). If $u_b$, $u_c$, $i_b$, $i_c$ are the actual phase-voltages and currents of a semi-four-phase machine, then in Eqn. (23) $i_D$ and $i_Q$ can be replaced by $i_b$ and $i_c$. However, for a three-phase machine, $i_D$ and $i_Q$ are transformed two-axis currents in the stationary reference frame, and therefore $i_D$ and $i_Q$ have to be expressed in terms of the phase-variable currents.

It is a main advantage of the implementations described in the present section that they do not require integration. In contrast to the implementation shown in Section 1.1 only one machine parameter has to be known, which can be obtained either by a standard test or could be directly obtained from on-line processing of monitored voltages and currents.

3.3 $|\bar{\psi}_m''| = $ constant

In Section 1.3 the implementations of the so-called $\bar{\psi}_m''$-oriented control have been described. It follows from Eqn. (6) that if $|\bar{\psi}_m''| = $ constant, the electromagnetic torque is proportional to the imaginary-axis component of the rotor currents ($i_y''$) expressed in a special reference frame aligned with the magnetising-flux linkage space-vector expressed in the rotor reference frame. Therefore, for the purposes of $\bar{\psi}_m''$-oriented control $i_y''$ and the space-angle $\mu_m - \theta$ have to be determined.

If the rotor currents of the slip-ring induction machine are monitored, it is possible to obtain $i_y''$ and $\mu_m - \theta$ by using analogue, digital or hybrid techniques, where—due to $|\bar{\psi}_m''| = $ constant—it is not necessary to perform integration.

Since $|\bar{\psi}_m''| = $ constant, the modulus of the space-vector of the magnetising voltage space vector ($\bar{u}_m''$) expressed in the rotor reference frame has to be proportional to $|\psi_m''|$ and also to the speed of $\bar{\psi}_m''$, relative to the stationary reference frame. The space-vector of the magnetising-voltages $\bar{u}_M''$ leads the space-vector of the magnetising-flux linkages ($\psi_m''$) by ninety degrees. As a consequence, the space angle of the magnetising-flux linkage space vector ($\psi_m''$) can be expressed in terms of the real and imaginary axes components of the magnetising-voltage space vector $\bar{u}_m''$. Therefore, by considering Eqn. (8), the following expression holds for $i_y''$.

$$i_y'' = (u_{md}i_{nd} + u_{mg}i_{ng})/|\bar{u}_m''| \quad (27)$$

where $u_{md}$, $u_{mq}$ are the real and imaginary components of the magnetising-voltage space vector $\bar{u}_m''$, and $|\bar{u}_m''|$ is the modulus of the same space vector. In Eqn. (27), $i_{rd}$ and $i_{rq}$ are the two-axis components of the rotor currents in the reference frame fixed to the rotors, and they can be obtained from the actual monitored phase-variable rotor currents by considering Eqns. (13) and (14).

Since Eqn. (27) contains quantities formulated in the rotor reference frame, all quantities can be obtained by directly monitoring the rotor currents of the machine.

One possible form of analogue implementation is shown in FIG. 40, where the inputs are the $i_{rd}$, $i_{rq}$ quantities. The rotor leakage inductance ($L_{rl}$) can be constant or can vary with the currents, allowing for the effects of rotor leakage flux saturation and skin effect to be incorporated in the implementation. The block containing "p" repreents differentiation with respect to time, thus "p" is an operator which stands for the first derivative. On the outputs of the circuit shown in FIG. 40, $i_y''$ and $\mu_m - \theta$ are present and $u_{md}$ and $u_{mq}$ are present on the input terminals of the rectangular-to-polar converter.

It should be noted by that using the equations presented in this section, it is possible to obtain digital or hybrid implementations. In general, if only two phase-variable rotor currents ($i_{rb}$, $i_{rc}$) are monitored, $i_y''$ and ($\mu_m - \theta$) can be obtained by connecting the implementation shown in FIG. 41.

In FIG. 41 $u_{md}$, $u_{mq}$ qre obtained by considering the real and imaginary parts of Eqn. (11). Alternatively, the "b" and "c"-phase magnetising voltages can be obtained by considering Eqn. (11) and the relationship between the three-phase and quadrature-phase components of the rotor currents. Thus $u_{md}$, $u_{mq}$ is used to obtain $|\bar{u}_m''| = \sqrt{u_{md}^2 + u_{my}^2}$ or alternatively $u_{mb}$, $u_{mc}$ can be used to obtain $|\bar{u}_m''|$. The phase-angle $\mu_m - \theta$ can be obtained from $\mu_m - \theta = \cos^{-1}(u_{md}/|\bar{\mu}_m''|)$ or from $\mu_m - \theta = \sin^{-1}(u_{mq}/\bar{u}_m''|)$ or directly from $u_{mb}$ and $u_{mc}$. The torque producing current component $i_y''$ can be obtained by using Eqn. (8) or Eqn. (27), or such forms of Eqn. (27), where the component magnetising voltages ($u_{md}$, $u_{mg}$) are directly expressed in terms of the phase-variables. It should be noticed that in Eqn. (27), $i_{rd}$ and $i_{rq}$ can be expressed in terms of $i_{rb}$ and $i_{rc}$.

It is a main advantage of this implementation that it does not require integration. Only two rotor currents have to be monitored and two rotor parameters ($R_r$, $L_r$) have to be known or have to be obtained from on-line signal processing. However, it is possible to have such a vector control scheme where only two rotor currents have to be monitored and only one parameter, the rotor resistance, has to be known or has to be obtained from one-line signal processing. This will be discussed in the following section.

3.4 $L_m|\bar{i}_m''|$ =constant

In Section 1.4 the implementations of the $\bar{i}_m''$-oriented control have been described. It follows from Eqn. (16), that if $L_m|\bar{i}_m|$ =constant, the electromagnetic torque is proportional to the imaginary-axis component of the rotor currents ($i_y'''$) expressed in a special reference frame aligned with $\bar{i}_m''$. Thus, for the purposes of $\bar{i}_m''$-oriented control $i_y'''$ and the space angle $\alpha'$ have to be determined.

If the rotor currents of the slip-ring machine are monitored, it is possible to obtain $i_y''$ by using analogue, digital or hybrid techniques, where—due to $L_m \cdot |\bar{i}_m''|$ =constant—it is not necessary to perform integration.

Since $L_m|\bar{i}_m''|$ is constant, the modulus of the magnetising voltage space vector $\bar{u}_m'''$, which is equal to the rate of change of $L_m\bar{i}_m''$, has to be proportional to $L_m|\bar{i}_m''|$ and also the speed of $\bar{i}_m''$, relative to the stationary reference frame. The space vector $\bar{u}_m'''$ leads the space vector $L_m\bar{i}_m''$ by ninety degrees. Thus, the space angle of $\bar{i}_m''$ can be expressed in terms of the real and imaginary-axes components of $\bar{u}_m'''$. Therefore, by considering Eqn. (17), the following expression is obtained for $i_y'''$, when $L_m|\bar{i}_m''|$ =constant.

$$i_y''' = (u_{mx}i_{rd} - u_{my}i_{rq})/|\bar{u}_m'''| \quad (28)$$

where $u_{mx}$ and $u_{my}$ are the real and imaginary-axes components of $\bar{u}_m'''$ and $|\bar{u}_m'''|$ is the modulus of $\bar{u}_m'''$. In Eqn. (28) $i_{rd}$, $i_{rq}$ are the two-axis components of the actual rotor currents and they can be obtained from the actual monitored phase-variable rotor currents by considering Eqns. (13) and (14). Thus, Eqn. (28) contains quantities, which can be obtained from the monitored rotor currents.

One possible form of analogue implementation is shown in FIG. 42, where the inputs are the currents $i_{rd}$, $i_{rq}$. In contrast to the implementation shown in FIG. 40, the present implementation is much simpler and does not contain differentiators. In FIG. 42 the only machine parameter which has to be known is the rotor resistance ($R_r$), which can be constant or a variable and can be obtained by standard tests or by on-line signal processing.

By using the equations presented in this section, it is possible to obtain digital or hybrid implementations. If in general, only two phase-variable rotor currents ($i_{rb}$, $i_{rc}$) are monitored, and $i_y''$ and $\alpha'$ can be obtained by considering the implementation shown in FIG. 43. In FIG. 43 $u_{mx}$, $u_{my}$ are obtained by considering $u_{mx}=r_r + d_t u_{my} = R_r L + q$. Alternatively, the "b" and "c"-phase magnetising voltages can be obtained by considering the equations of $u_{mx}$ and $u_{my}$ and the relationship between the three-phase and quadrature-phase components of the rotor currents. Thus, $u_{mx}$ and $u_{my}$ are used to obtain $|\bar{u}_m'''| = \sqrt{\mu_{mx}^2 + \mu_{my}^2}$ or alternatively $u_{mb}$, $u_{mc}$ can be used to obtain $|u_m'''|$. The phase-angle $\alpha'$ can be obtained by considering $\alpha' = \cos^{-1}(U_{mx}/|\bar{u}_M''|$ or $\alpha' = \sin^{-1}(\mu_{my}/|U_m'''|)$ or the equivalents of these expressions in terms of the phase-variable voltages.

The torque producing current component can be obtained by considering Eqn. (28), or by considering such forms of Eqn. (28) where $u_{mx}$ and $u_{my}$ are expressed in terms of the phase-variables. It should be noted that in Eqn. (28) $i_{rd}$ and $i_{rq}$ can be expressed in terms of $i_{rb}$ and $i_{rc}$.

It is again a main advantage of the present implementation that it does not require integration or differentiation. Only two rotor currents have to be monitored and only one rotor parameter ($R_r$) is used in the implementation.

4. Circuits for obtaining the signals necessary for vector control at very low operating frequencies At very low frequencies it is difficult to obtain an accurate representation of the flux signals by the integration of the terminal voltages corrected by the ohmic drops. Therefore, several circuits are proposed in this section which while suitable for the normal range of power frequencies are also suitable for very low frequency operation, including servo-drives. These circuits can be used independently of the circuits shown in the previous sections or in hybrids, which contain both types of circuits.

4.1 $\psi_m$-oriented control and $\bar{i}_m'$-oriented control

In FIG. 44 there is shown an implementation where on the input terminals the two-axis components of the terminal currents ($i_D$, $i_Q$) and the rotor angle ($\theta_r$) are present. These currents are the actual phase-variable currents of a quadrature-phase smooth-air-gap machine or, in the case of a three-phase-smooth-air-gap machine, they are transformed currents (as used previously in Section 1.1). This circuit can be used for obtaining the two-axis components of the magnetising flux ($\psi_{mD}$, $\psi_{mQ}$) if linear magnetic conditions are assumed. It is then possible to obtain from these the values of $|\bar{\psi}_m|$ and $\mu_m$, by using R→P conversion.

In FIG. 44 the first block represents a transformation $\underline{T}$, where $$\underline{T} = \begin{bmatrix} \cos\theta_r & \sin\theta_r \\ -\sin\theta_r & \cos\theta_r \end{bmatrix} \quad (29)$$

In the next two blocks, L is the self-inductance of a winding on the supply-side of the machine, T' and T are the transient time constant and no-load time constant of a winding on the other side of the airgap and p is the differential operator. In the third block an inverse transformation ($\underline{T}^{-1}$) is performed. The values of $\psi_{mD}$ and $\psi_{mQ}$ are obtained from $\psi_D$ and $\psi_Q$ by utilising subtraction circuits, where $L_i$ is a leakage inductance of a winding on the supply side of the machine. It also is possible to have fully analogue or digital implementations of FIG. 44, or certain parts of FIG. 44 can be implemented by analog and other parts by digital circuits. The parameters in FIG. 44 can be known constants or can be obtained by on-line signal processing.

In Section 1.2 the implementation of $\bar{i}_m'$-oriented control has been described. It has been a main feature that $L_m|\bar{i}_m'|$ and $\alpha$ have been obtained in such a way that there has been no need to subtract leakage drops from $\psi_D$, $\psi_Q$. Similar techniques can now be adopted utilising the circuit shown in FIG. 44 to obtain $\psi_D$ and $\psi_Q$ and from these obtaining $L_m|\bar{i}_m'|$ and $\alpha$ by rectangular-to-polar conversion, as described with reference to FIGS. 8, 9 and 10.

It is possible to extend the circuit shown in FIG. 44 to incorporate the effects of main flux saturation by using the circuit shown in FIG. 45. Referring to this figure, in the four blocks, which follow the block described by transformation T, the operator inductances $L_{xx}(p), L_{yy}(p), L_{xy}(p)$ are present. These depend on both $|\bar{\psi}_m|$ and $\mu_m - \theta_r$, and also contain the "static" and "dynamic" magnetising inductances of the machine. These inductances which depend on the level of saturation can be obtained directly from the magnetising curve of the machine, or can be obtained by on-line signal processing. Under linear magnetic conditions $L_{xx}(p) = L_{yy}(p) = L(1+T'p)/(1+Tp)$ and $L_{xy}(p) = 0$, where $L, T', T$ do not depend on $|\bar{\psi}_m|$ and $\mu_m - \theta_r$, and the circuit shown in FIG. 45 then reduces to FIG. 44.

4.2 $\bar{i}_m$-oriented control 4.2.1 Utilization of monitored currents

For rapid torque control, it is useful to implement an $\bar{i}_m$-oriented control scheme where $L_m \bar{i}_m^*$ defines the rotor flux vector. In a special reference frame fixed to the vector $\bar{i}_m^*$, the electromagnetic torque is as follows $$t_e = C(L-L')|\bar{i}_m^*|i_y \qquad (30)$$

where $L, L'$ are the stator inductance and stator transient inductance, respectively, and $i_y$ is the quadrature-axis component of the stator current in the special reference frame. If $\mu_m$ is the space angle of $\bar{i}_m^*$, $i_y$ can be obtained from the stationary-axis stator current components $(i_D, i_Q)$ by utilizing Eqn. (2). Thus for an $\bar{i}_m^*$-oriented control, it is necessary to obtain $|\bar{i}_m^*|$ and $\mu_m$. Two schemes will now be presented which both incorporate the effects of main flux paths and utilize the monitored stator currents and also the rotor speed $(\omega_r)$. The rotor speed can be monitored or can be obtained from an extra equation: $t_e - t_L = J d\omega_r/dt$, where $t_L$ is the load torque and $J$ is the moment of inertia.

4.2.1.1 A scheme in which $|\bar{i}_m^*|$ and $\mu_m$ are obtained from the stationary-axes components of $\bar{i}_m^*$ FIG. 46 shows a circuit to obtain $|\bar{i}_m^*|$ and $\mu_m$. The inputs are $i_D, i_Q$ and $\omega_r$. The boxes with the crosses represent multipliers and the boxes with the integration sign represent integrators. $|\bar{i}_m^*|$ and $\mu_m$ are present on the output of the rectangular-to-polar converter. It must be emphasised that all the parameters shown in FIG. 46 vary with saturation. Thus, the rotor time constant $(T_r)$, the magnetising inductance $(L_m)$ and the inductances $L_{mD}, L_{mQ}$ and $L_{DQ}$ all depend on $|\bar{i}_m^*|$ and, in addition $L_{mD}, L_{mQ}, L_{DQ}$ also depend on $\mu_m$ and on the "static" and "dynamic" magnetising inductances of the machine. It is possible to implement the circuit shown in FIG. 46 by analogue, digital, or hybrid techniques.

4.2.1.2 A scheme in which $|\bar{i}_m^*|$ and $\mu_m$ are obtained by utilising the direct-and quadrature axis components of the stator currents in the special reference frame directly FIG. 47 shows a circuit to obtain $|\bar{i}_m^*|$ and $\mu_m$, where the inputs are again $i_D, i_Q$ and $\omega_r$. The transformation $\underline{T}$ which is dependent on the angle $\mu_m$ is obtained by means of Eqn. (2). The box with the symbol $\div$ represents a divider. Both the rotor time constant $(T_r)$ and $T_r^*$ are dependent on the level of saturation, and $$T_r^* = T_r + \left(1 + \frac{|\bar{i}_m^*|}{L_m} \frac{dL_m}{d|\bar{i}_m^*|}\right) \qquad (31)$$

where $dL_m/d|\bar{i}_m^*|$ represents a differentiation with respect to the modulus of $\bar{i}_m^*$.

The function $L_m(|\bar{i}_m^*|)$ can be obtained by preliminary tests or by on-line signal processing. If digital implementation is used, and the results of preliminary tests are utilized, it can be stored in a look-up-table.

If instead of using $i_Q$ and $i_D$ as inputs, the modulus $|\bar{i}|$ and the phase angle $(\alpha)$ of the stator current vector are used, then FIG. 48 shows a possible implementation, where the transformation $(\underline{T})$ is avoided.

If $i_D, i_Q$ and $\omega_r$ are the input signals, it is possible to convert $i$ and $i_Q$ by a rectangular-to-polar converter into $|\bar{i}|$ and $\alpha$ and this can be combined with the circuit shown in FIG. 48, to obtain $\mu_m$ and $|\bar{i}_m^*|$.

4.2.2 Utilization of monitored supply voltages

If an induction machine is supplied by a voltage-source inverter and the inputs to the system are the stator voltages and the rotor speed, then $|\bar{i}_m^*|$, $\mu_m, i_x$ and $i_y$ can be obtained by utilizing the circuit shown in FIG. 49. This circuit also incorporates the effects of main flux saturation.

In FIG. 49, R is the stator resistance and $L_{rl}$ is the rotor leakage inductance, $T'$ and $T_r$ are the stator transient time constant, and the rotor time constant respectively, and $T_r^*$ is defined by Eqn. (31). Due to magnetic non-linearity, $L_m$ is a variable, and is a function of $|\bar{i}_m^*|$. Thus, $T', T_r, L_m, L_r, T_r^*$ vary with the level of saturation. It should be noted that $T_r$ and $T_r^*$ also vary due to the fact that the rotor resistance is changing during the operation of the machine. All the changing parameters can be obtained by using parameter identification schemes. It is possible to obtain a fully digital or analogue or hybrid realisation of the circuit shown in FIG. 49. It should be noted that again $\omega_r$ can be obtained from the equation of motion, or it can be monitored.

We claim:

1. A control system for an M-phase A.C. machine having star connected windings, including:
   means for measuring currents in at least $(M-N)$ phases of the machine, where $N=2$ if M is even and $N=1$ if M is uneven, said current measuring means including a current shunt or a Hall-device for each phase measured;
   means for measuring instantaneous values of the voltages in said $(M-N)$ phases including a voltage divider network for each phase measured, the voltage divider network forming a star connected resistor network having a plurality of first resistors having $(M-N)$ points, each point of the star connected resistor network being connected via a respective high resistance resistor to the point of the respective star winding on the machine, the voltage output being taken across each first resistor being proportional to the voltage in the respective machine winding; and
   means for obtaining control signals for alteration of an input voltage and/or current to the machine to maintain the machine in an efficient operating condition in accordance with said measured currents and instantaneous voltage values.

2. A control system as claimed in claim 1, in which the obtained control signals are $|\bar{\psi}_m|, i_y$ and $\mu_m$, where $|\bar{\psi}_m|$ is a modulus of a magnetizing flux-linkage space vector, $i_y$ is a quadrature axis component of the stator currents and $\mu_m$ is a space angle of the magnetizing flux-linkage space vector.

3. A control system as claimed in claim 1, in which the means for obtaining control signals includes a plurality of first subtraction means for subtracting resistance voltage drops of each winding from the input voltage to produce a first output voltage, first integrating means for integrating the output from each of the plurality of the first subtraction means to produce a plurality of first flux values, a plurality of second subtraction means for subtracting the leakage flux linkage from each of the first flux values to produce a plurality of resulting flux values, a plurality of third subtraction means for obtaining the difference between a combination of two of the resulting flux values to produce signals proportional to the inphase and quadrature components of the magnetising flux linkages space vector, a rectangular-to-polar converter connected to receive the outputs of the plurality of third subtraction means to produce a signal proportional to the modulus of the magnetising flux linkage space vector and a further signal proportional to the spatial angle of the magnetising flux linkage space vector.

* * * * *